United States Patent
Vleugels et al.

(10) Patent No.: US 8,089,982 B1
(45) Date of Patent: * Jan. 3, 2012

(54) METHOD AND APPARATUS FOR MEDIUM RESERVATION AND MEDIUM RESERVATION MODIFICATION IN A COMMUNICATION SYSTEM WITH MEDIUM RESERVATION MODIFICATION GRANTED WITHOUT REQUIRING ADDITIONAL MEDIUM ARBITRATION

(75) Inventors: Katelijn Vleugels, San Carlos, CA (US); Barry Thompson, Menlo Park, CA (US); Nils Bunger, Mountain View, CA (US); Ilya Minkin, Los Altos, CA (US)

(73) Assignee: Ozmo, Inc., Palo Alto, CA (US)

( * ) Notice: Subject to any disclaimer, the term of this patent is extended or adjusted under 35 U.S.C. 154(b) by 809 days.

This patent is subject to a terminal disclaimer.

(21) Appl. No.: 11/423,258

(22) Filed: Jun. 9, 2006

Related U.S. Application Data

(63) Continuation of application No. 11/376,629, filed on Mar. 14, 2006, now abandoned.

(60) Provisional application No. 60/735,663, filed on Nov. 10, 2005.

(51) Int. Cl.
*H04L 12/413* (2006.01)

(52) U.S. Cl. ...................................................... 370/447

(58) Field of Classification Search ............... 370/395.4, 370/395.41, 236.1, 229, 237, 443, 445, 447, 370/461, 462, 477
See application file for complete search history.

(56) References Cited

U.S. PATENT DOCUMENTS

| | | | |
|---|---|---|---|
| 5,065,398 A | | 11/1991 | Takashima |
| 5,719,859 A | * | 2/1998 | Kobayashi et al. ............ 370/347 |
| 5,886,989 A | * | 3/1999 | Evans et al. .................... 370/347 |
| 6,202,156 B1 | | 3/2001 | Kalajan |
| 6,556,582 B1 | * | 4/2003 | Redi ............................... 370/443 |
| 6,804,532 B1 | | 10/2004 | Moon et al. |
| 6,829,227 B1 | | 12/2004 | Pitt et al. |
| 7,020,472 B2 | * | 3/2006 | Schmidt ......................... 455/450 |
| 7,039,027 B2 | * | 5/2006 | Bridgelall ...................... 370/329 |
| 7,224,678 B2 | * | 5/2007 | Billhartz ........................ 370/338 |
| 7,359,398 B2 | | 4/2008 | Sugaya |
| 2002/0093929 A1 | * | 7/2002 | Mangold et al. .............. 370/336 |

(Continued)

OTHER PUBLICATIONS

Office Action for U.S. Appl. No. 11/423,351, dated Jan. 23, 2009.

(Continued)

*Primary Examiner* — Derrick Ferris
*Assistant Examiner* — Mang Yeung
(74) *Attorney, Agent, or Firm* — Kilpatrick Townsend & Stockton LLP; Philip H. Albert

(57) ABSTRACT

Medium reservation modifications can be requested and granted wherein a master device allocates a medium using reservations that are observed by other devices sharing the medium and a slave device complies with reservations by holding data for transmission until its reservation in time arrives by determining a reserved length of an upcoming transmitting opportunity reserved for a slave device, determining, at the slave device, a desired length for transmitting data from the slave device over the medium, comparing the reserved length and the desired length to determine if a medium reservation modification is warranted, if the medium reservation modification is warranted, requesting, using the slave device and the medium, during the reserved time covered by the medium reservation, the medium reservation modification, and determining, at the master device, whether to grant or deny the medium reservation modification and conveying the determination to the slave device.

16 Claims, 16 Drawing Sheets

U.S. PATENT DOCUMENTS

2002/0163933 A1  11/2002  Benveniste
2005/0064860 A1   3/2005  DeLine
2005/0210157 A1*  9/2005  Sakoda .......................... 709/251
2006/0256070 A1  11/2006  Moosavi et al.
2007/0002814 A1*  1/2007  Benveniste ................... 370/338
2007/0263567 A1* 11/2007  Habetha et al. ............... 370/329

OTHER PUBLICATIONS

Office Action for U.S. Appl. No. 11/423,351, dated Jul. 2, 2009.
Office Action for U.S. Appl. No. 11/423,351, dated Oct. 19, 2009.
Office Action for U.S. Appl. No. 11/423,351, dated Jun. 30, 2010.

* cited by examiner

PP- PWN Protocol (802.11x, etc.)
SP- SWN Protocol (802.11x, overlay, HS Protocol, etc.)

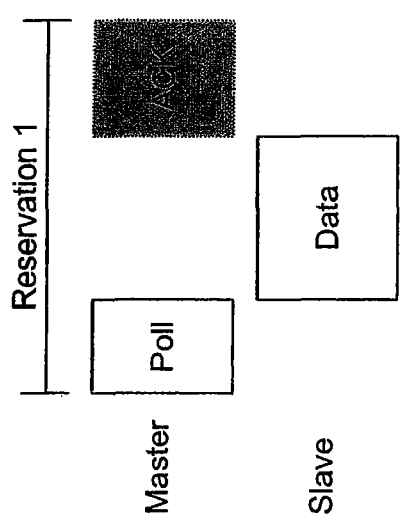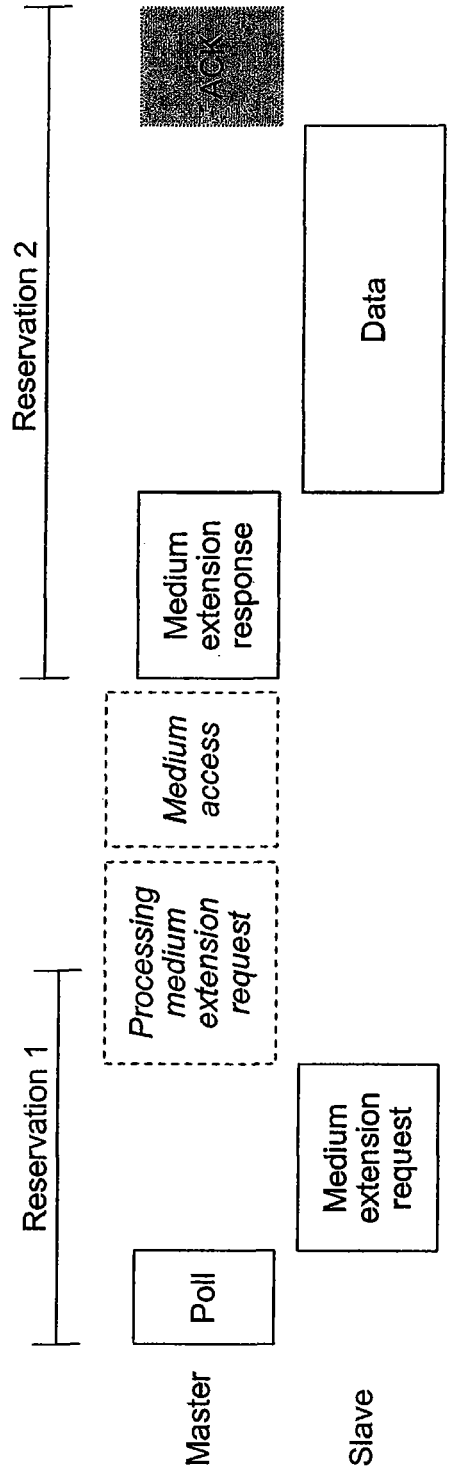

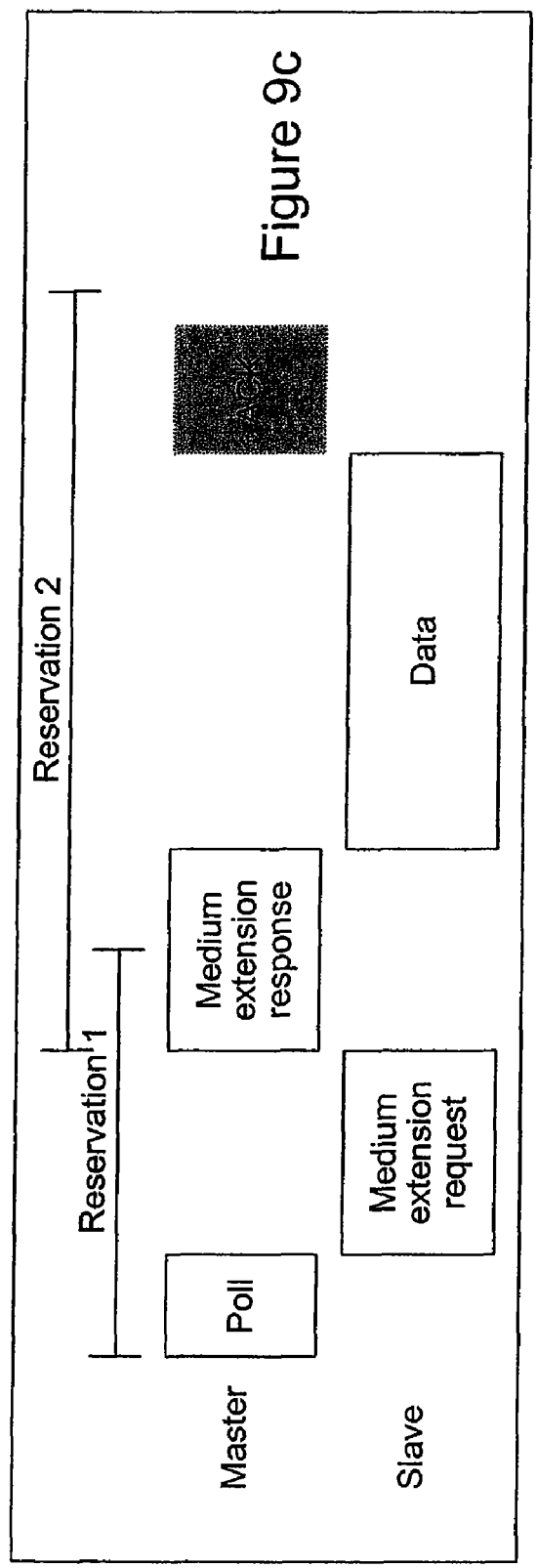

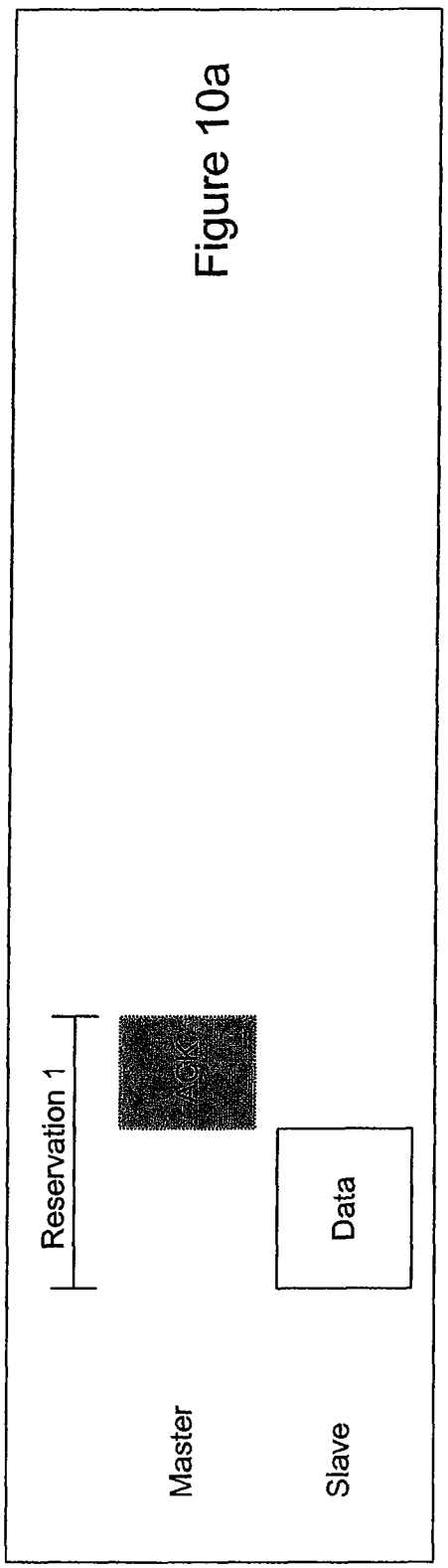
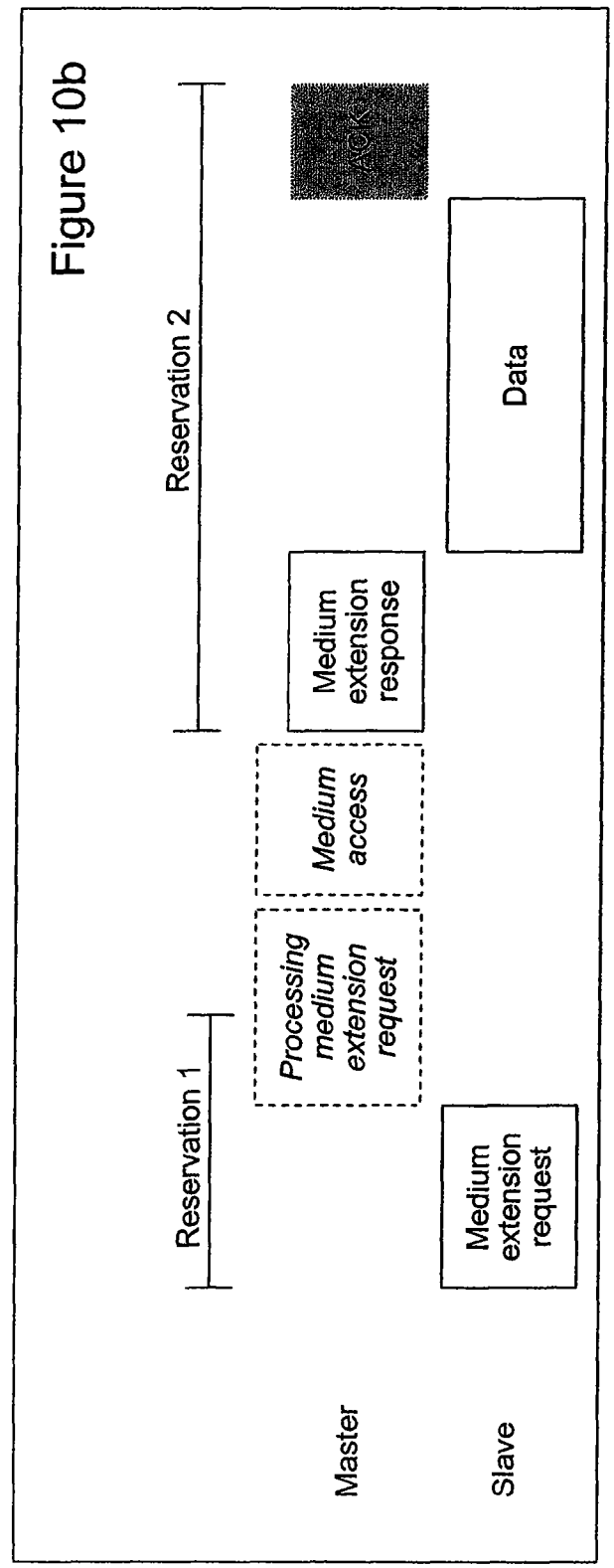

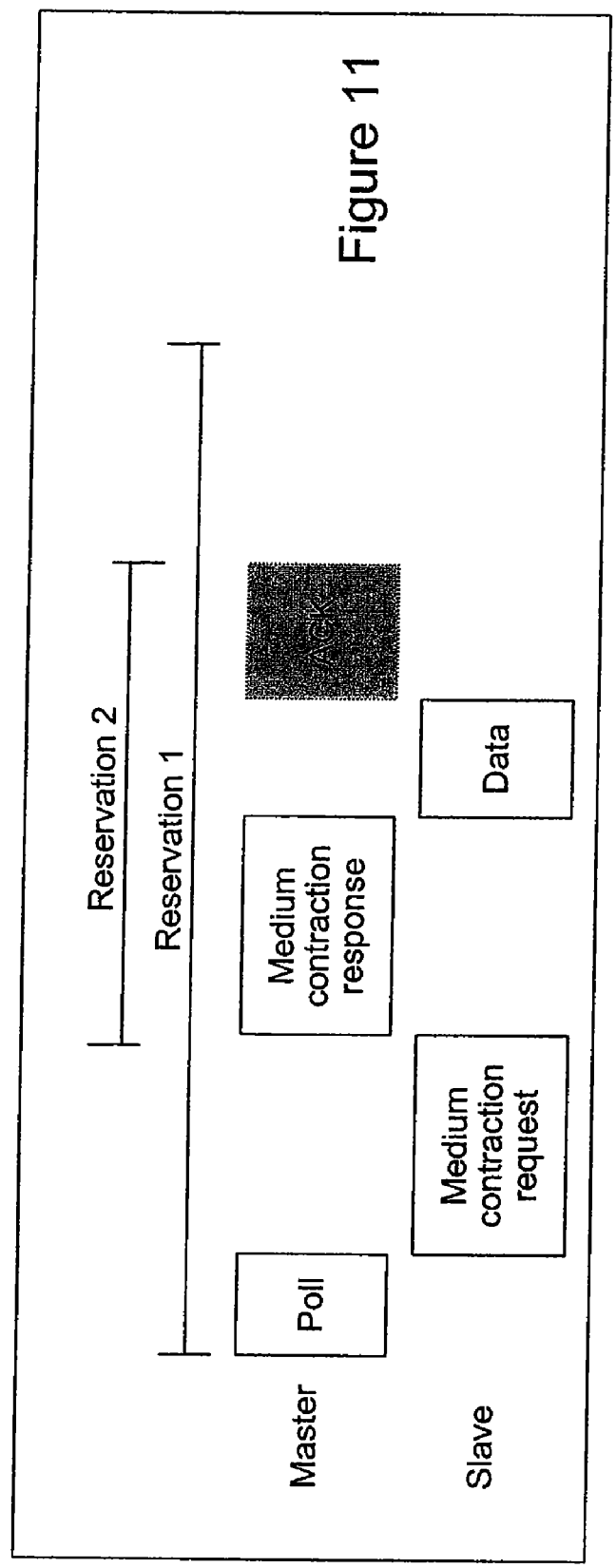

METHOD AND APPARATUS FOR MEDIUM RESERVATION AND MEDIUM RESERVATION MODIFICATION IN A COMMUNICATION SYSTEM WITH MEDIUM RESERVATION MODIFICATION GRANTED WITHOUT REQUIRING ADDITIONAL MEDIUM ARBITRATION

CROSS-REFERENCES TO RELATED APPLICATIONS

This application is a continuation of U.S. patent application Ser. No. 11/376,629, filed Mar. 14, 2006, which claims the benefit of and is a non-provisional of U.S. Patent Application Ser. No. 60/735,663 filed on Nov. 10, 2005, which is incorporated by reference in its entirety for all purposes.

FIELD OF THE INVENTION

The present invention relates to electronic devices that contend among themselves for use of a medium in general and more particularly to electronic devices that reserve the medium and defer to the reservations of others using the medium.

BACKGROUND OF THE INVENTION

Wireless communication among electronic devices has been increasing as the benefits and conveniences of wireless communication become more preferred. A wireless communication system or wireless network is often described as containing nodes (or more precisely, circuitry associated with the concept of a node) and a wireless medium (WM) over which the nodes' circuitry communicate to convey information. Where some action or activity is described as happening at (or being done at) a node, it should be understood that the electronic device and/or network interface that is at (or simply is) the node is the circuitry that is performing the action or activity. For example, sending data from node A to node B means transmitting a signal from circuitry associated with node A and receiving that signal (or more precisely, the transmitted signal modified by the medium) using circuitry associated with node B.

The information conveyed between nodes can be digital data and digitized analog signals, or other forms of information, but communication system design often assumes that digital data is being conveyed and higher network layers interpret the data appropriately. For purposes herein, it is assumed that data exists at one node, is provided to lower network layers, is conveyed to another node over a WM, is received by another node correctly or incorrectly and then is conveyed to upper network layers at the receiver. In one model, two networked devices run applications that pass data between themselves by having the sending device's application convey data to an application layer of a network stack, which conveys data to lower levels, ultimately to a medium access control (MAC) layer and a physical network (PHY) layer, and the process is inverted at the recipient.

To set up a wireless network, all that is needed is a plurality of electronic "node" devices capable of transmitting and receiving data in a manner understood by the two (or more) nodes involved in a conversation, with the node devices appropriately placed such that they can communicate in the medium that exists between the devices. The medium could be some type of dielectric material, but more commonly, the medium is the air space and objects (walls, chairs, books, glass. etc.) that are between devices or are positioned such that they have an effect on the signals transmitted between devices. Presumably, the node devices are assigned unique identifiers to distinguish transmissions, but this might not always be necessary. Examples of such unique identifiers are MAC addresses and IP addresses.

As the existence of various wireless media and their properties are known and are not the focus of this disclosure, the medium is often just shown in the attached figures as a cloud. Thus, it should be understood that supplier of a set of two or more powered devices that can communicate supplies a wireless network; the wireless medium is presumed.

Wireless communication systems can be categorized based on coverage range, which in some cases is dictated by use. A wireless local area network or "WLAN", has a typical coverage range on the order of 300 feet and is useful for providing communications between computing devices in some (possibly loosely) defined space such as a home, office, building, park, airport, etc. In some modes of operation, one or more of the nodes is coupled to a wired network to allow other nodes to communicate beyond the wireless network range via that wired network. In 802.11 terminology, such nodes are referred to as "access points" and the typical protocol is such that the other nodes (referred to as "stations") associate with an access point and communication is generally between a station and an access point. Some wireless networks operate in an "ad hoc" mode, wherein node devices communicate with each other without an access point being present.

A personal area network or "PAN" is a short-range wireless network, with typical coverage ranges on the order of 30 feet, usable to connect peripherals to devices in close proximity, thereby eliminating cables usually present for such connections. For example, a PAN might be used to connect a headset to a mobile phone or music/audio player, a mouse or keyboard to a laptop, a PDA or laptop to a mobile phone (for syncing, phone number lookup or the like), etc. Yet another example of a wireless PAN application is wireless medical monitoring devices that wirelessly connect monitoring hardware to a pager or similar read-out device. Yet another example is a remote control that connects to a wireless-enabled electronic device.

Some networks might fall in a gray area between a WLAN and a PAN, but in many cases, a network is clearly one or the other. A personal area network (PAN) is generally used for the interconnection of information technology devices within the range of an individual person, typically within a range of 10 meters. For example, a person traveling with a laptop will likely be the sole user of that laptop and will be the same person handling the personal digital assistant (PDA) and portable printer that interconnect to the laptop without having to plug anything in, using some form of wireless technology. Typically, PAN nodes interact wirelessly, but nothing herein would preclude having some wired nodes. By contrast, a wireless LAN tends to be a local area network (LAN) that is connected without wires and serves multiple users.

Equipment connecting to a wireless communication system in general, and to a wireless PAN communication system in particular, is typically used for applications where power usage, weight, cost and user convenience are very important. For example, with laptops, low-cost accessories are preferable, and it is critical that the power usage of such accessories be minimized to minimize the frequency at which batteries need to be replaced or recharged. The latter is a burden and annoyance to the user and can significantly reduce the seamless user experience.

Weight and complexity are additional concerns in many wireless communication systems. Particularly with mobile devices such as laptops, weight is a concern and the user would rather not have to deal with the hassle of carrying around a multiplicity of devices. Mobile devices are devices that can be expected to be in use while moving, while portable devices are devices that are movable from place to place but generally are not moving when in use. The considerations for mobile devices also apply to portable devices, albeit sometimes with less of a concern. For example, with a wireless connection of a peripheral to a laptop, both devices are likely to be used while mobile or moved frequently and carried around. Thus, weight and the number of devices is an important consideration. With portable devices, such as a small desktop computer with a wireless trackball, as long as the total weight is below a user's carrying limit, the weight is not as much a concern. However, battery life is often as much a concern with portable devices as it is with mobile devices.

There are shades of grey between "portable" and "mobile" and it should be understood that the concerns of mobile applications and portable applications can be considered similar, except where indicated. In other words, a mobile device can be a portable device in the examples described herein.

Where a computing and/or communication device connects to a WLAN, it uses wireless circuitry that often times are already built into the computing device. If the circuitry is not built in, a WLAN card (such as a network interface card, or "NIC") might be used. Either way, some antenna circuitry is used and power is required to run that circuitry.

Where a device also connects wirelessly to peripherals or other devices over short links often referred to as forming a "personal area network" or "PAN", circuitry is needed for that connection as well. This circuitry is typically provided with an external interface unit that is plugged into or onto the device. For example, where the device is a laptop, the circuitry might be provided by a Universal Serial Bus (USB) dongle that attaches to a USB port of the laptop. The USB dongle contains the radio circuitry needed to communicate wirelessly over the short wireless links.

In general, a wireless connection between two or more devices requires that each device include wireless network circuitry for conveying signals over the medium and receiving signals over the medium, as well as processing/communication circuitry to receive, process and/or convey data and/or signals to that wireless network circuitry. The processing/communication circuitry could be implemented with actual circuits, software instructions executable by a processor, or some combination thereof. In some variations, the wireless network circuitry and processing/communication circuitry are integrated (such as with some PDAs, wireless mice, etc.) or are separate elements (such as a laptop as the processing/communication circuitry and a network PCMCIA card as the wireless network circuitry).

For ease of understanding this disclosure, where it is important to make the distinction between devices, a device that exists to provide wireless connectivity is referred to as a "network interface", "network interface device", "wireless network interface device" or the like, while the device for which the wireless connectivity is being provided is referred to as a "computing device" or an "electronic device" notwithstanding the fact that some such devices do more than just compute or might not be thought of as devices that do actual computing and further notwithstanding the fact that some network interface devices themselves have electronics and do computing. Some electronic devices compute and communicate via an attached network interface device while other electronic devices might have their network interface devices integrated in a non-detachable form. Where an electronic device is coupled to a wireless network interface to a wireless network, it is said that the device is a node in the network and thus that device is a "node device".

An 802.11x (x=a, b, g, n, etc.) NEC (network interface card) or 802.11x built-in circuitry might be used for networking an electronic device to the outside world, or at least to devices at other nodes of a WLAN 802.11x network, while using an external dongle or a similar interface device with Bluetooth or proprietary wireless circuitry for communication between the computing device and the peripheral or other PAN node.

A device that is equipped with an 802.11x-conformant network interface to the WM is herein referred to as a station or "STA". In 802.11 terminology, set of STAs constitutes a Basic Service Set ("BSS"). A set of STAs that communicate in a peer-to-peer configuration is referred to as an "802.11x ad-hoc" network or an independent BSS (MSS). A set of STAs controlled by a single coordinator is referred to as an 802.11x infrastructure network. The coordinator of a BSS is herein referred to as the access point or "AP".

A typical access point device is wired to a wired network and is also wired to an external source of electricity, such as being plugged into a wall socket or wired to a building's power grid. For example, a building, an airport or other space people might occupy might have fixed access points mounted throughout the space to provide adequate network coverage for the purpose of providing access to the Internet or other network for the people occupying the space, via their portable or mobile devices. As such, access points are typically always on so that the wireless network is available whenever suitable portable or mobile devices are carried into the space.

The use of different technologies for WLAN and wireless PAN connectivity increases cost, weight and power usage (at the COORD side and/or the PER side), and impairs a seamless user experience. Those disadvantages could be resolved by equipping the peripheral or PAN nodes with 802.11x wireless circuitry, thus eliminating the dedicated PAN technologies altogether. However, PAN nodes are often very power-sensitive devices. They usually are battery-operated devices and their small form factor prohibits the use of bulky batteries with large capacity. Instead, small batteries with limited power capacity are used. Such peripherals cannot typically support the power usage requirements typical of WLAN wireless circuitry, such as 802.11x circuitry. A host of other difficulties are present in view of the optimizations, goals and designs of differing network protocols.

Another drawback is that independent LANs and PANs may interfere if they share a common frequency band.

Many communications systems have multiple devices that might use a communications medium wherein the medium can only support transmissions from less than all of the devices simultaneously. For example, where the medium is wireless frequency spectrum within a given spatial volume, perhaps only one or a few devices can transmit using that wireless frequency spectrum in that spatial volume at one time. To avoid situations where transmissions are interfering, such communication systems typically have a protocol for coordinating use of the medium by the multiple devices.

Coordination could be by preassignment, wherein each device is allocated a time slice and only transmits (if at all) during its assigned time slice. This wastes valuable bandwidth unless all of the devices have data to transmit during their assigned time slice. Coordination could also be done by contention and reservation, as is common in network protocols, such as the Ethernet protocol for wired networks, 802.11 for wireless networks, etc.

With contention and reservation, a device that wishes to transmit first listens to the wireless medium for activity. If there is no activity, it signals an intent to reserve the medium. If the reservation succeeds, such as when a reservation message is sent before any other device sends an interfering transmission, the other devices using the medium would defer for a reservation period before they attempt to transmit data (typically such transmission is in turn preceded by that device's reservation of the medium).

Special problems arise where the devices that need to reserve the medium are low-power devices that might not transmit with high enough power that other devices will detect and those devices might transmit and swamp the low-power device's transmission. To deal with such cases, a coordinator for the network might handle requests for reservation. For example, where the coordinator is operated by the device that uses the other devices on the network, the coordinator C might send out a signal indicating a reservation for another device D and include a reservation time sufficient for device D to transmit the data requested by coordinator C.

A medium reservation for communication between two or more devices might be for a regular or one-time communication sequence between the devices. In many systems, reservations are made for streaming media data types or other constant-rate or near-constant-rate communications (hereafter called "streaming communications"). Examples include RSVP (Reservation Protocol) over Ethernet and the Isochronous data transfer type over Universal Serial Bus (USB), defined herein as USB 1.0, 1.1, 2.0, Wireless USB, and further enhancements and derivatives of USB. In other systems, a reservation mechanism is part of a collision-avoidance scheme, but is not specifically designed for streaming communications. In yet other cases, the reservation mechanism could exist for different reasons.

The present invention relates to electronic devices that contend among themselves for use of a medium in general and more particularly to electronic devices that reserve the medium and defer to the reservations of others using the medium.

A common medium reservation system used in many communications systems is a message exchange comprising a Ready-To-Send (RTS) message from one device and Clear-To-Send (CTS) message from a second device. The RTS message from the first device indicates a desire for the first device to transmit; CTS from the second device indicates that the first device may now transmit. A specific example of a communication system with this medium reservation scheme is an 802.11-compatible Wireless Local Area Network (WLAN), though this and similar schemes are used in other communications systems.

In some systems with a medium reservation mechanism, the reservation mechanism is asymmetric, i.e., one device (known as the "master") makes a reservation for communication initiated from another device (known as the "slave"), but the slave device does not make reservations for the master device. The reason for the slave device relying on the master device for reservations may vary. For example, where the slave device lacks some or all of the information about other devices to be able to make a correct or fair decision about when to transmit, the slave device would allow the master device to reserve the medium on its behalf. As another example, the slave device may not have a communication path to all other devices sharing the communications channel. As yet another example, the slave device may be a simple device without the capability required to make such a decision. For any combination of these reasons and/or other reasons, the system is set up such that the master device makes reservations for the slave device.

As used herein, unless otherwise indicated, a master device is a device in the communication system responsible for the reservation scheduling for a particular transaction between two devices and the slave device is a device involved in the transaction but not responsible for the scheduling. "Master" and "slave" are designations for a particular one-way communication. It is possible for a device to be a master device for communications with one device and a slave in its communications with another device. It is also possible for a device to be a master device for transmitting to a device, and a slave device for receiving from that same device. Further, which device is master device and which is slave device may be a static designation or may change between communication sessions or even during a communication session. Such a change may be negotiated according to a communication standard or may be outside the scope of the communications standard.

In a system with a medium reservation mechanism, a service interval (SI) is defined herein as the interval between the start of two successive service periods (SPs). A service period (SP) is defined herein as a contiguous time during which one or more attempts is made to communicate one or more messages from a master device to a slave device and/or a slave device to a master. In general, it is expected that during an SP, both devices are attempting to communicate with each other by either transmitting a packet or listening for a packet to be transmitted by the other device. It is possible that there are small inactivity times in between packet exchanges, but such inactivity times are typically significantly shorter than the SI. The service interval may be a constant value or can be irregular from service period to service period. A service period may always be a fixed length or may vary from service period to service period. As an example, a master device and a slave device may agree on timing such that they can power down some or all of their circuitry in between SPs. In such cases, the master and slave device preferably time their power up process such that the necessary circuits are operational at, or slightly prior to, the start of an SP.

The mechanism whereby a master device reserves the medium for a slave device works well when a master device knows, at the start of a service period, the amount of data a slave device will transmit during that service period. In that case, a master device makes the reservation for the time period needed for the amount of data the slave device has ready and the slave device transmits the data when its reserved time slot occurs.

However, in many applications, a master does not know the amount of data a slave device has to transmit in a given service period, so it is possible that a master device will not create a reservation long enough in a particular service period for a slave device to complete its communication in that same service period, or conversely that the master device may create an excessively long medium reservation for the slave's communication which the slave cannot make use of and unnecessarily takes up medium capacity.

A variable-bit-rate (VBR) stream is defined as any communication in which the amount of data per unit time is not constant. This can be a variable-bit-rate media stream, a constant-bit-rate (CBR) stream plus a variable data component, or any other data stream where the amount of data per service period is not known by the receiving system. A VBR stream therefore obviously poses problems for a master device attempting to make a correct medium reservation for a stream coming from a slave.

In contrast to a VBR stream, a constant-bit-rate (CBR) stream presents the same number of bits per unit of time or per some other known unit. In an ideal system, the master could predict exactly the number of bits that the slave device would like to transmit based on the time or distance since the last service period. The master could therefore always make the correct reservation for the slave's transmission.

However, in many cases a stream that is nominally a CBR stream still does not make it possible for the master device to always make the correct reservation. There could be a number of reasons why a medium reservation might be incorrect, even in a CBR application. For example, if data was lost during an earlier service period that the slave device wishes to retry in addition to the other data that should be transmitted in this service period, or the slave device has additional data to transmit in this service period in addition to the usual CBR data. Other reasons might include that there is uncertainty in the time at which the slave's transmit opportunity begins which has not been accounted for in the length of the medium reservation. This can occur, for example, in a system where the start of the slave's transmit opportunity is based on a message from the master device that could get delayed due to routing delays or contention access mechanisms. This can also occur due to other reasons.

Yet other reasons include where the master device and slave device are operating off independent or loosely-synchronized clocks that have drifted since the last communication, causing the two to make a different calculation of the amount of data to be transmitted in this service period, or if the master device's calculation is based on an expectation of the data rate of the master device and/or slave device communication, and the master device and/or slave device use a different data rate for the transmission. This could happen, for example, if the reservation is in units of time instead of units of bits or bytes, and the master device and/or slave device transmit at a different bit rate than the master device anticipated in its calculation.

One example of a medium reservation system is defined by the Enhanced Wireless Consortium (EWC), which has a proposal pending to the IEEE 802.11(n) task group. See, for example, "Interoperability MAC Specification v1.0" published by the EWC (hereinafter the "EWC specification"). The proposal defines a mechanism for using a CTS-to-self, an RTS-CTS exchange, or other packet sequence with an extended reservation (called a "long NAV") to protect multiple packets within the transmission opportunity (TXOP). The concept of an asymmetric reservation is included in this EWC specification as well, where a reservation is made with a poll from a master device (called the Hybrid Controller (HC)), and responded to by a slave device.

A limitation of the technique in the EWC specification is that it does not provide a mechanism for a slave device to request a reservation extension. In order to support an uncertain amount of data delivery in a service interval, the master device needs to over-allocate the medium then have the slave device use a specific packet (a "CF-End" packet, for example) to indicate the end of its transmission. This is undesirable because, in many applications, the slave device only occasionally needs extra medium capacity in a service period. In such cases, the master device would have over-allocated the medium many times for these occasional extra transmissions. Furthermore, other devices may have turned off their receivers after hearing the long NAV message from the master and will still be disabled at the time when a CF-End packet indicates the early end of the period. Those devices that had their receivers disabled would then not be able to take advantage of the freed-up medium.

The technique for medium contraction in the EWC specification also has an important limitation. A medium contraction is signaled in the EWC specification using the CF-End packet at the end of a device's transmission. It is not ideal to wait to signal a medium contraction until the end of a transmission because (1) it does not give other devices that may want to use the medium any time to prepare a new transmission before the transmission has ended, (2) other devices may have turned off their receivers while waiting until the end of the previous reservation, and therefore will not know about the newly-available medium, and (3) the transmission of a CF-end packet takes up additional network capacity, making it an unattractive technique especially in applications where the nominal medium reservation requirements are known and deviations from this nominal medium reservation requirement only occur occasionally.

In light of the above, improved medium reservation protocols, methods and apparatus are proposed.

BRIEF SUMMARY OF THE INVENTION

Embodiments of the present invention disclosed herein may include a reservation-modification system in which a slave device can request a modified reservation from a master device and communicate using the new reservation within the same service period without violating the reservation scheme imposed by a master device. This "medium reservation modification" request can be referred to a "medium reservation extension" request or a "medium reservation contraction" request depending on whether the slave is asking for a larger medium reservation or a smaller reservation.

When a time slot for a slave device to transmit occurs, a communication sequence begins comprising the following parts: (1) in some embodiments, a master poll (optional); (2) a medium reservation modification request (medium reservation extension request or medium reservation contraction request) from a slave device for a larger or smaller reservation in the same service period through the transmission of a request to the master; and (3) a master device response to the request with a grant of the request, a partial grant of the request, or a denial of the request. Unlike other medium-reservation systems, the entire communication sequence can be negotiated immediately (or shortly thereafter) following the initial poll and can complete within a single service period.

In some embodiments, the communication sequence may occur with only a single arbitration for the medium; the subsequent messages in the sequence start immediately after the previous message or close enough in time that there is no additional need for medium arbitration. Performing the entire sequence with a single arbitration minimizes the time that the master device and slave device must have their receivers enabled, thus maximizing power savings.

The slave device may communicate a portion of the data to be transmitted together with the medium reservation modification request, or may not communicate any data until a satisfactory reservation has been negotiated. If some of the data has been transmitted already, the slave/master device may or may not be optimized to request/grant a reservation only for the portion of the data that has not been communicated yet.

This medium reservation extension mechanism and devices configured to support the mechanism have a number of advantages over existing reservation mechanisms. The mechanism does not incur the additional latency of waiting until the next service period to transmit extra data while still operating within the medium reservation made by the master. The processing of this request in the slave device and/or master can be handled at various layers of the each device's processing stack: it can be in hardware, firmware, drivers, application-level software, or any combination of these and other layers.

This medium reservation extension mechanism provides low latency for all classes of data delivery, including constant-bit-rate and near-constant-bit-rate applications, variable-bit-rate applications, asynchronous reliable delivery applications, and other traffic classes.

The medium reservation extension is also useful to a slave device to retransmit data that failed delivery to the master in the previous service period. The slave device makes a medium reservation extension request covering the failed data as well as the current data belonging to this service period. If a sufficiently large medium reservation extension is granted by the master, the slave can transmit the failed data as well as the current data the master device within the current service period.

Conversely, the medium reservation contraction mechanism prevents the excess reservation of the medium by a master device for a slave device which may or may not have enough data to use the full reservation. With a medium reservation contraction mechanism, the medium can be reserved for only the time that is required for the slave's communication with the master, which frees up the medium for other communications between the master device and slave device or between other devices on the same communications medium.

In specific embodiments, a computing device is interfaced to a wireless personal area network (PAN) in an environment wherein co-existing wireless local area networks (WLANs) might be present and devices of the wireless PAN signal to coordinate usage of the wireless PAN while the WLANs might be active. In order to cause deferral of devices associated with the co-existing WLAN, a PAN COORD device contends for the medium, reserves the medium and uses that reservation time to coordinate PAN traffic and that activity might be done as a station in the WLAN or as a device in the WPAN using a protocol that allows for WLAN devices to appropriately interpret the reservations and defer. The PAN device for which the reservation was made can request modification of that reservation, to increase or decrease the reservation period.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3 comprises several examples of elements of a PWN and an SWN.

FIG. 9a is a timing diagram of a poll-response sequence in accordance with embodiments of the present invention, for a case where a master device reserves the medium for a slave device for a time period acceptable to the slave device.

FIG. 9b is a timing diagram of a poll-response sequence in accordance with embodiments of the present invention, for a case where a master device reserves the medium for a slave device for a time period and the slave device desires a different time period.

FIG. 9c is a timing diagram of a reservation sequence similar to that of FIG. 9b, but where the request for a different time period is granted within the original medium reservation, therefore not requiring an additional medium arbitration.

FIG. 10a is a timing diagram of a reservation sequence similar to that of FIG. 9a, but without requiring a poll.

FIG. 10b is a timing diagram of a reservation sequence similar to that of FIG. 9b, but without requiring a poll.

FIG. 11 is a timing diagram of a poll-response sequence in accordance with embodiments of the present invention, for a case where a master device reserves the medium for a slave device for a time period and the slave device desires a shorter time period.

DESCRIPTION OF THE INVENTION

Figure 1:
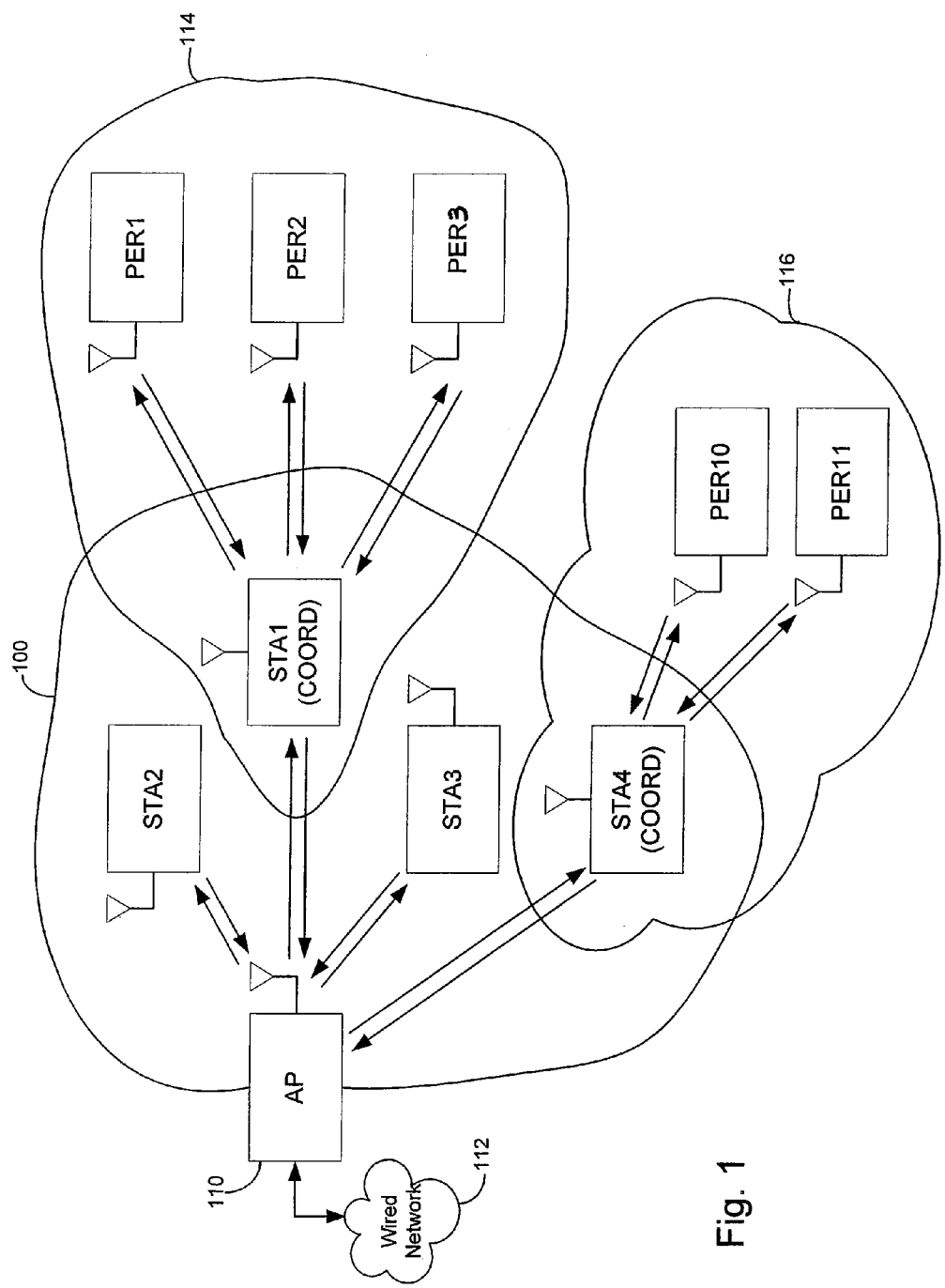
FIG. 1 is a block diagram illustrating various devices operating as part of a primary wireless network (PWN), a secondary wireless network (SWN), or both, wherein the SWN operates using an SWN protocol that co-exists with the PWN protocol.

The present disclosure describes methods and apparatus for operating a secondary wireless network ("SWN") in the presence of a primary wireless network ("PWN"), including features, elements, configurations and/or programming that allow for co-existence of SWN devices in a space where PWN traffic might occur, as well as features, elements, configurations and/or programming that include coordination between a PWN and an SWN (or pluralities of these) such that a device might handle traffic for each of the networks present.

For example, a computing device might have a common network interface that allows the computing device to be a node in the PWN and a node in the SWN. In a particular example, a computing device is an 802.11x STA that is a member of a PWN capable of associating with and communicating with an AP for that PWN (as well as possibly other devices in that PWN) using a network interface while also elements of that same network interface are used to simultaneously participate as a WPAN coordinator ("COORD") to coordinate the SWN, such that the COORD can communicate with members of one or more SWN without losing the COORD's connectivity to the primary network and using common hardware components to interface to both networks. Where a COORD is connectable to the PWN, it is referred to as a "dual-net" device, as it coordinates communication over the SWN such that it can be connected to both simultaneously, possibly including steps that involve signaling within the PWN as part of SWN activity (e.g., reserving the PWN to avoid interference before using the SWN).

In some instances, the COORD is not set up to connect to the PWN, but it still performs the necessary actions to coordinate traffic for the SWN it coordinates, including performing actions that improve coexistence of the PWN and SWN.

In the general example, the computing device is a portable and/or mobile computing and/or communications device with some computing capability. Examples of computing devices include laptop computers, desktop computers, handheld computing devices, pagers, cellular telephones, devices with embedded communications abilities and the like. Examples of peripheral devices include typical computer, telephone etc. accessories where wireless connections are desired, but might also include less common devices, such as wearable devices that communicate with other devices on a person or even to communicate with other nearby devices, possibly using the electrical conductivity of the human body as a data network. For example, two people could exchange information between their wearable computers without wires, by transmission through the air, or using their bodies and/or clothing.

The computing devices may interface to 802.11 WLANs or other wireless networks to communicate with other network nodes, including nodes accessible through wired connections to the wireless network (typically via an access point). The computing devices also may interface to PAN devices over a personal area network (PAN), such as wireless headsets, mice, keyboards, accessories, recorders, telephones and the like. A wide variety of PAN devices are contemplated that are adapted for short-range wireless communications, typically bi-directional and typically low power so as to conserve a PAN device's limited power source. Some PAN devices might be unidirectional, either receive-only or transmit-only, devices.

In a typical approach, where a STA needs to connect to more than one wireless network, the STA associates with one wireless network and then when associating with another wireless network, it disassociates with the first wireless network. While this is useful for a WLAN where a STA might move out of one network's range and into the range of another network, this is not desirable when latency needs to be less than an association set-up time. The latency incurred with this switching procedure easily amounts to several hundreds of milliseconds.

In certain applications, it may be desirable for a STA to connect to multiple networks without incurring long switching-induced latencies. For example, consider a typical PER device, that of a cordless mouse. Since update rates for a cordless mouse during normal operation are on the order of 50 to 125 times per second, switching-induced latencies involved with 802.11x association set ups are not acceptable. Furthermore, the switching overhead significantly reduces the STA's usable communication time, defined as the time that the STA is available to transmit or receive data.

In a specific embodiment of the invention, a wireless peripheral like a mouse, is attached to an 802.11x-enabled computing device like a laptop computer, using the 802.11x wireless circuitry inside the laptop, or connected to the laptop via a NIC card. At the same time, the laptop may be connected to the Internet via a regular WLAN network, using the same 802.11x circuitry. Herein, a peripheral or PAN node will be referred to as "PER". Multiple PERs can connect to a single wireless PAN. The wireless device coordinating the wireless PAN is called the coordinator ("COORD"). Where the COORD is also able to connect to the 802.11x network, the COORD is referred to as a "dual-net" device, since it handles both networks. A typical dual-net device in this example is a device that is a STA on an 802.11x network while also having wireless peripherals used by applications running on that device.

While not always required, the PERs are power-sensitive devices. It should be understood that an object labeled "PER" need not be a peripheral in the sense of an object with a purpose to serve a particular purpose, but rather an object that performs the behaviors herein referred to as behaviors of a PAN node. For example, a printer can be a PER when it is connected to a desktop computer via a PAN, but some other device not normally thought of as a peripheral can be a PER if it behaves as one.

Examples of the concepts and disclosures provided above will now be further explained with reference to the figures. In the figures, like items are referenced with a common reference number with parenthetical numbers to indicate different instances of the same or similar objects. Where the number of instances is not important for understanding the invention, the highest parenthetical number might be a letter, such as in "100(1), 100(2), . . . , 100(N)". Unless otherwise indicated, the actual number of items can differ without departing from the scope of this disclosure.

Specifically, FIG. 1 illustrates various devices operating as part of a primary wireless network (PWN) 100, a secondary wireless network (SWN) (such as 114 or 116), or both. In the figure, an access point (AP) 110 supports an infrastructure mode for PWN 100, coupling various stations to the network allowing, for example, network traffic between a station and a wired network 112. By communicating with the AP, a station can retrieve information from the Internet and exchange data with other stations that may or may not be part of the Basic Service Set (BSS) managed by the AP.

As shown in the example, the stations present are STA1, STA2, STA3 and STA4. Each station is associated with a node in PWN 100 and has the necessary hardware, logic, power, etc. to be a node device in PWN 100. Station STA1 also coordinates SWN 114 as the COORD for that network shown comprising PER1, PER2 and PER3. Likewise, station STA4 coordinates SWN 116 as the COORD for the network comprising STA4, PER10 and PER11. In FIG. 1, each node device is shown with an antenna to indicate that it can communicate wirelessly, but it should be understood that an external antenna is not required.

Other network components and additional instances might also be present. For example, more than one AP might be present, there might be overlaps of BSSes and other network topologies might be used instead of the exact one shown in FIG. 1 without departing from the scope of the invention. Examples used herein for PWN 100 include 802.11x (x=a, b, g, n, etc.), but it should be understood that the primary wireless network may well be another network selected among those in present use or available when the primary wireless network is implemented.

In this example, the secondary wireless networks are assumed to be used for PAN functionality. The PAN can be used for, but is not limited to, fixed data rate applications where exchange of data can be scheduled and the amount of data to be exchanged is known and a single dual-net device might interface with multiple PERs. Because the dual-net device may be a regular STA in the first WLAN, it can power-down as needed without problems, unlike an access point. However, since it is also the COORD, peripheral communication could be lost if the peripheral is powered up but the dual-net device/COORD is not. This can be dealt with using mutually agreeable inactivity periods.

Figure 2:
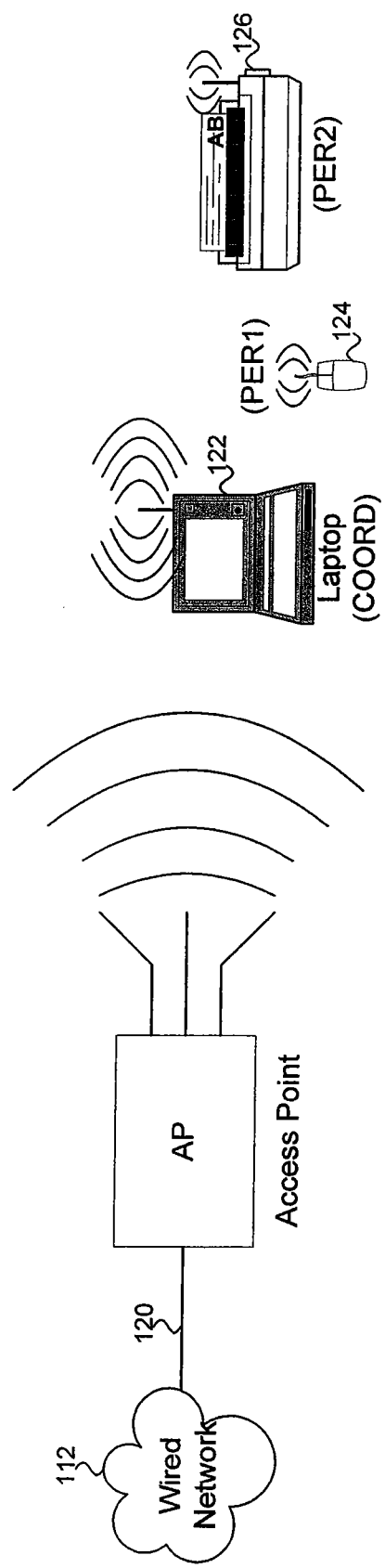
FIG. 2 is a block diagram illustrating a subpart of the elements of FIG. 1, in greater detail.

FIG. 1 shows, at a high level, the interplay among various nodes of various networks. FIG. 2 illustrates a subpart of the elements of FIG. 1, illustrating in greater detail. In this figure, AP 110 is coupled to wired network 112 via cable 120 and might communicate using any suitable wire-based networking protocol. On the other side, AP 110 transmits signals to a station device, in this case a laptop 122, using the AP's antenna and those signals are received by laptop 112 using its antenna. Signals can also flow in the other direction. Such communications would be done according to a PWN protocol, such as an 802.11x protocol.

Laptop 122 (a dual-net device in this example) in turn can communicate with the peripherals shown, in this example a wireless mouse (PER1) 124 and a wireless printer (PER2) 126. It may be that power for wireless printer 126 comes from an external power outlet, in which case power consumption might be less of a concern than with mouse 124 if it operates on battery power. Nonetheless, both peripherals might use the same power-saving protocol. Power conservation might also be performed on the dual-net device, for example, when it is a laptop.

FIG. 3 comprises several views of network layouts of elements of a PWN and a SWN.

Figure 3A:
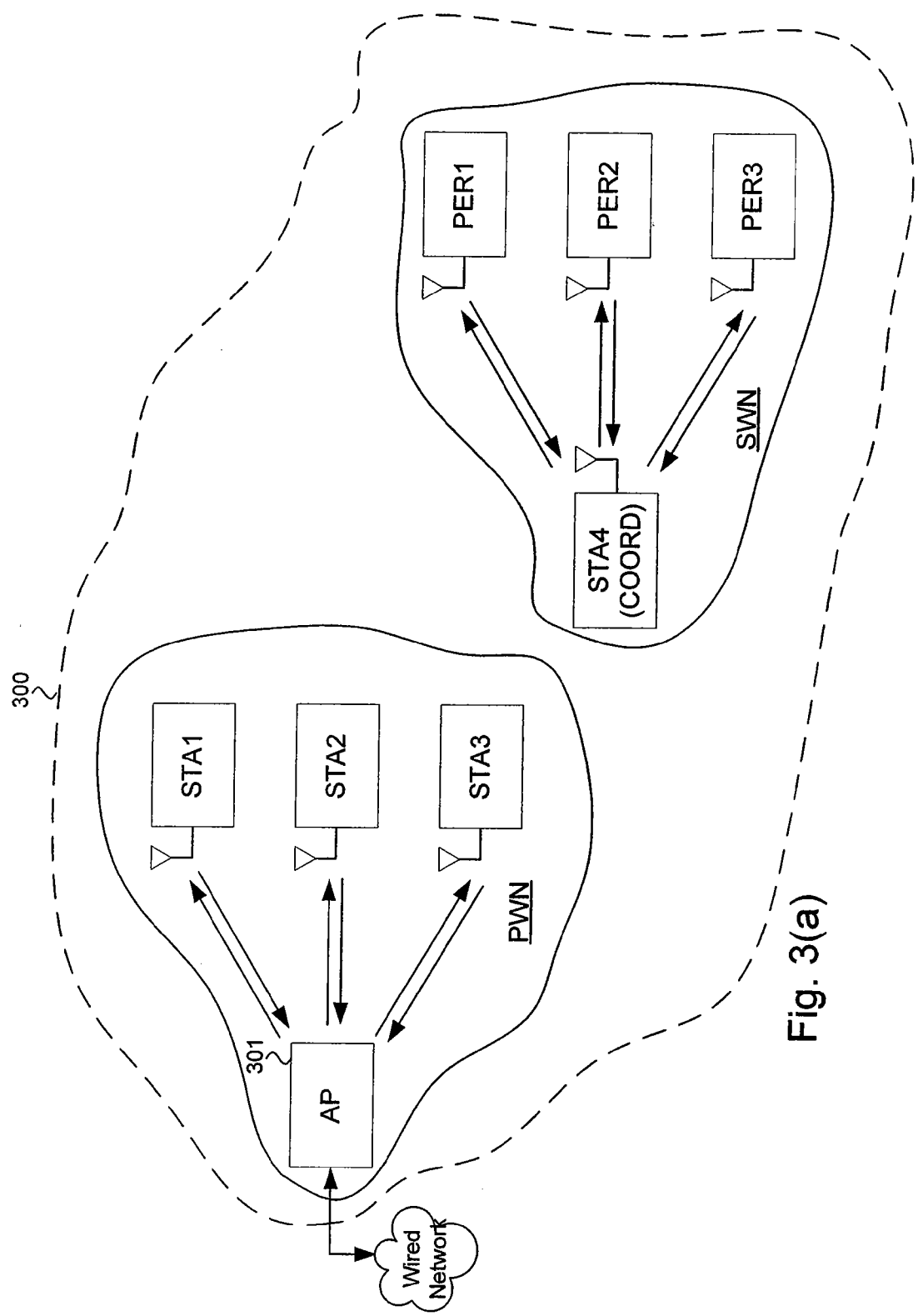
FIG. 3(a) is a block diagram showing elements of a PWN and an SWN that co-exist, but do not necessarily span the two networks.

FIG. 3(a) is a block diagram showing wireless elements that might be operating in a common space 300 such that they share a wireless medium or parts of it. In the description that follows, the examples assume that the range of an access point, AP 301, is the common space 300. In other examples, the common space is the range of the AP and STA devices in the AP's BSS, or some other variation. As shown in FIG. 3(a), AP, STA1, STA2 and STA3 form the primary wireless network PWN, while devices STA4, PER1, PER2, and PER3 form the secondary wireless network SWN. STA4 is the master for the SWN. Note that STA4 need not be associated as a STA with AP 301.

Figure 3B:
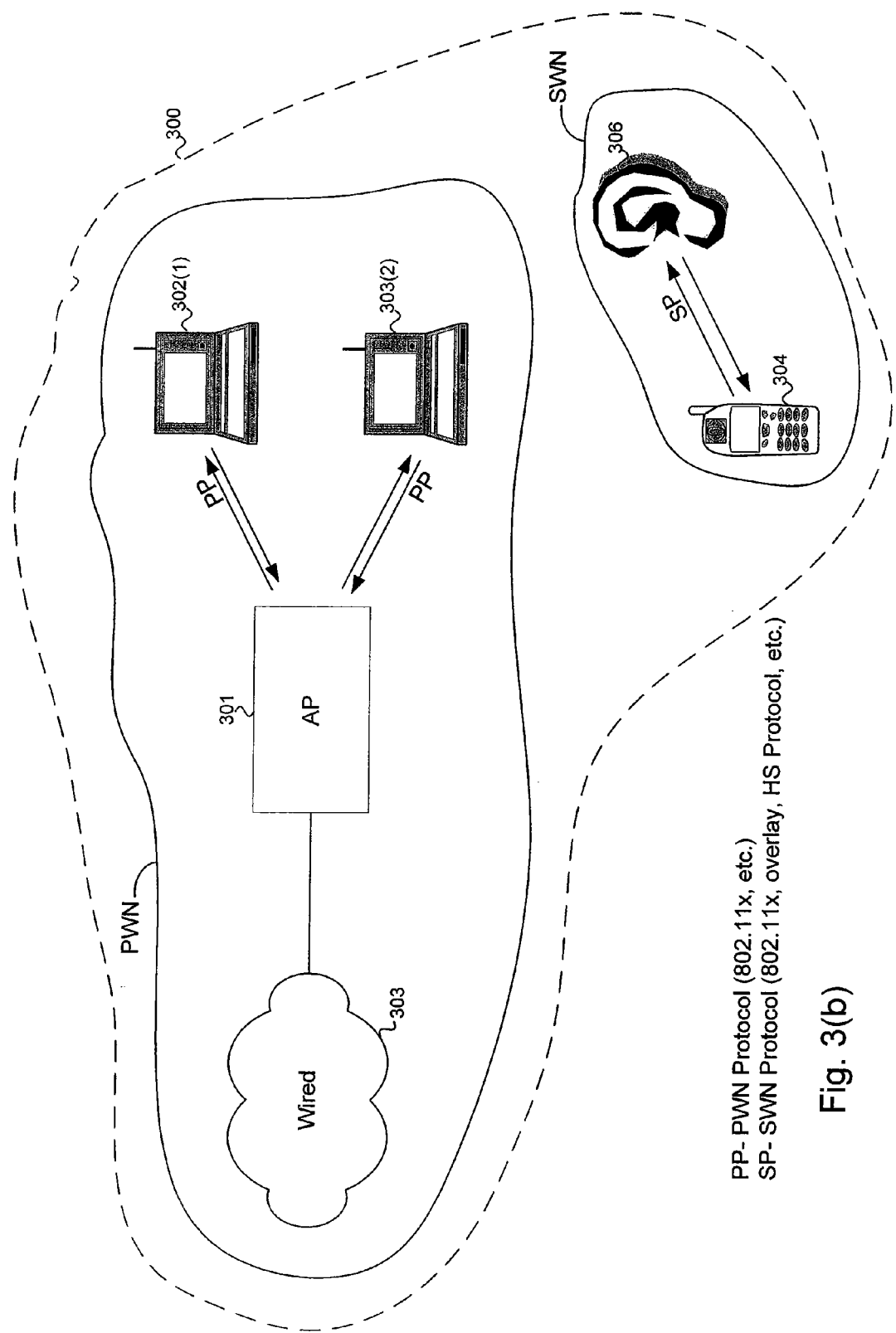
FIG. 3(b) is a block diagram showing specific objects that might be used as the elements of a PWN and an SWN.

FIG. 3(b) illustrates a more specific example. In that figure, PWN is managed by AP 301 and has node devices 302(1) and 302(2) (laptops in this example figure) associated with the PWN. A mobile phone 304 is the master for the SWN that includes a headset 306. Mobile phone 304 may well not have the capability to join PWN, but since the PWN and SWN share the same wireless medium, preferably mobile phone 304 has COORD functions that would enhance coexistence of PWN devices and SWN devices. AP 301 is also coupled to a wired network 303.

The various protocols used between devices are marked as "PP" for PWN protocol, which might be an 802.11x protocol or the like and "SP" for SWN protocol, which might be a modified 802.11x protocol, an overlay protocol, or the like. As used herein, an overlay protocol is an SWN protocol that has elements that are reuses of elements of a PWN protocol to provide one or more advantages, such as ability to use some common hardware components for both networks, the ability to communicate in the SWN without having to disassociate with the PWN, the ability to signal in the SWN with signals that are understood by SWN devices but are such that they are, if not understood, are acted upon by PWN devices to provide desirable actions. For example, an overlay protocol might be such that a PWN-only device that hears an SWN packet will be able to decode the packet enough to determine that the packet is not for the PWN-only device and also determine how long the wireless medium will be busy with SWN traffic so that the PWN-only device can appropriately defer.

Of course, if all of the PWN devices and SWN devices had the same constraints and could support a wider-area network standard protocol, then perhaps all of the devices would just be nodes in one network and use that network's protocol for contention, coordination, and the like. However, where one-size-fits-all does not work, it is preferred that some sort of coexistence enhancement occur.

Figure 3C:
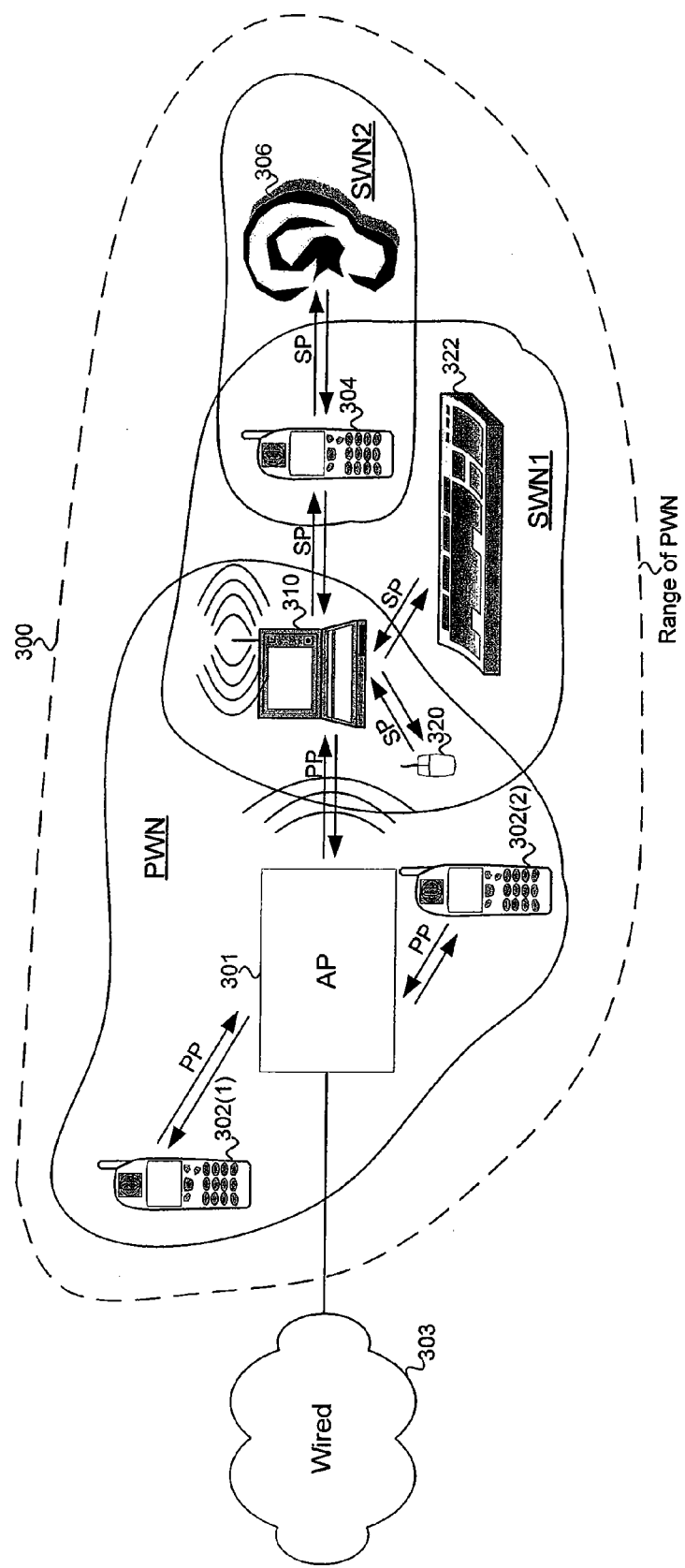
FIG. 3(c) is a block diagram of a variation of subparts wherein objects might span the PWN and the SWN.

FIG. 3(c) is a block diagram of another topology example, wherein at least one device spans a network. In that example, AP 301 communicates with an 802.11x-enabled Personal Digital Assistant (PDA) 305 and an 802.11x-enabled mobile phone 307, while phone 307 acts as a COORD for a secondary network to interact with a wireless headset 306. In some variations, PDA 305 and phone 307 might communicate in ad hoc mode. As an example of the use of these elements, phone 307 might be used to simultaneously conduct a wireless Voice-over-IP (VoIP) call and attach wireless headset 306.

Figure 3D:
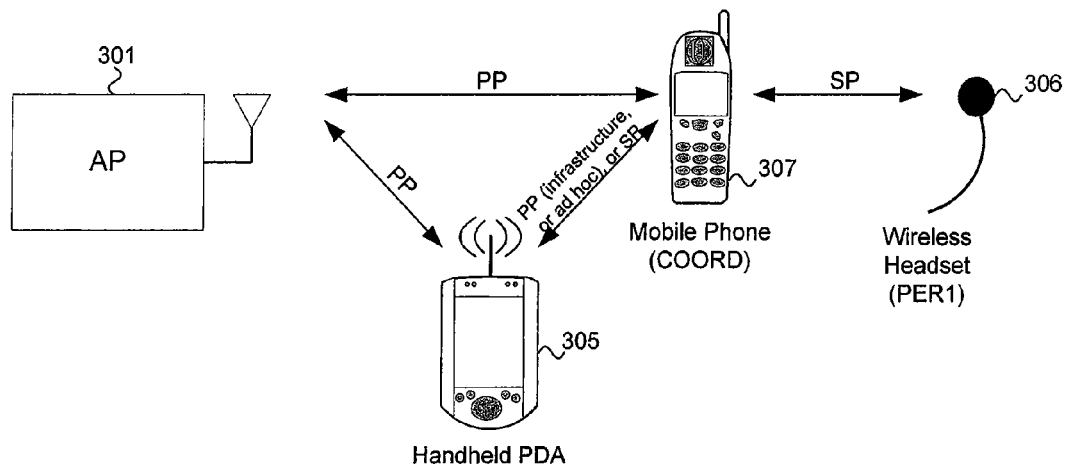
FIG. 3(d) is a block diagram showing further examples.

FIG. 3(d) is a block diagram illustrating a more complicated example. As shown there, AP 301 is coupled to wired network 303 and is wirelessly coupled with its associated stations: laptops 302(1) and 302(2), as well as a laptop 310 that is a COORD for a secondary wireless network, SWN1. Laptop 310 coordinates SWN1, which includes mouse 320, keyboard 322 and mobile phone 304. Mobile phone 304 can in turn be a COORD for another secondary wireless network, SWN2 while being a PER in SWN1. As shown, the communications with AP 301 use a PWN protocol, such as an 802.11x protocol, while the communications among devices in SWN1 and SWN2 are done using the SWN protocol. As explained elsewhere herein, there are many benefits of using an SWN protocol such as an 802.11x overlay instead of an all 802.11x protocol and by suitable design of the SWN protocol, the SWNs and the PWN can co-exist and, in the case of dual-net devices, can reuse common network interface devices for the dual-net device's participation in both a PWN and an SWN.

In the example of FIG. 3(d), it may be expected that mouse 320, keyboard 322, mobile phone 340 and headset 306 are not programmed for, and/or do not have circuits to support, use with an 802.11x primary network, but nonetheless they might use an SWN protocol that has many aspects in common with an 802.11x protocol, modified to accommodate the different needs of SWN devices while providing a measure of coexistence. The network interface for a dual-net device might comprise standard hardware for interfacing to the PWN and software to control that standard hardware to use it for SWN protocol traffic. Thus, with the selection of the SWN protocol such as those described or suggested herein, SWN support can be added to a computing device without requiring any new hardware.

Figure 4:
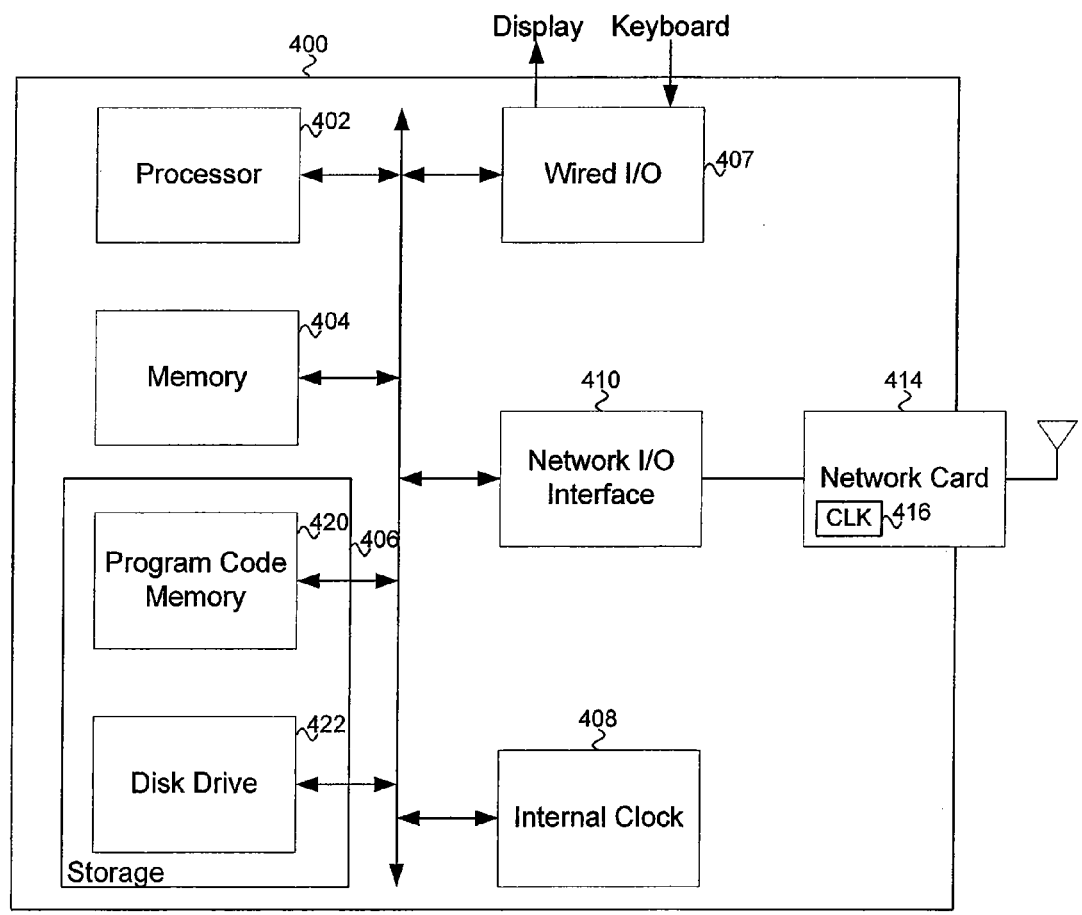
FIG. 4 is a block diagram of an example wireless PAN coordinator ("COORD") that might also operate as a dual-net device that could simultaneously maintain connections with a PWN and a SWN.

FIG. 4 illustrates an example of the internal details of a COORD device. As explained herein, such devices might include laptops, desktop computers, terminals, MP3 players, home entertainment systems, music devices, mobile phones, game consoles, network extenders or the like. What is shown is one example. In this example, a COORD device 400 is shown comprising a processor 402, the memory 404, program and software instruction storage 406, a wired input/output interface 407 for displays, keyboards and the like, an internal clock 408, and a network I/O interface 410, each coupled to a bus 412 for intercommunication. Network I/O interface 410 is in turn coupled to a network card 414, which includes its own circuitry such as an internal clock 416 and other components not shown. In some cases, the network card is not distinct and in some cases there might not even be much hardware associated with the networking function if it can be done by software instructions.

Program and software instruction storage 406 might comprise program code memory 420 and disk drive 422. Program instructions for implementing computing, communication, etc. functions, as well as network interfacing, can be stored in program code memory 420 and might be loaded in there from instructions stored on disk drive 422. Program code memory 420 might be just a portion of a common memory that also has memory 404 as a portion. For example, both memories might be allocated portions of RAM storage so that instructions and data used by programs are stored in one memory structure. With a general purpose, network-centric, signal processing-centric or other style of processor, functional modules that might be illustrated by blocks in a block diagram might be implemented entirely in software, embodied only in code stored in computer readable media. However, when executed as intended, the processor and the stored instructions perform the functions of those modules. For example, a device might be described as having a network stack that performs certain functions, but the network stack might not be represented in individual hardware elements.

Figure 5:
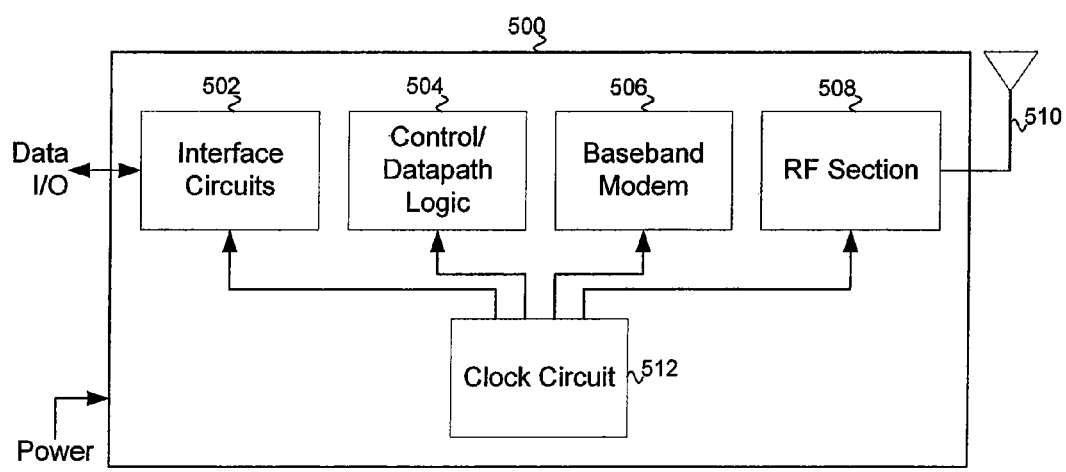
FIG. 5 is a block diagram of a network card that might be used to interface a COORD/dual-net device to the various networks.

FIG. 5 illustrates an example of a network card 500, shown comprising interface circuits 502 for interfacing network card 500 to a computing device (not shown), control/datapath logic 504, baseband modem circuitry 506, an RF section 508, an antenna 510 and a card clock circuit 512. Control/datapath logic 504 is configured to send and receive data to and from the computing device via interface circuits 502, send and receive data to and from baseband mode circuitry 506 and process that sent or received data as needed. Card clock circuit 512 might provide circuit clocking services as well as real-time clock signals to various other elements of network card 500. Note that logic elements shown and described might be implemented by dedicated logic, but might also be implemented by code executable by a processor. For example, some of the control/datapath logic's functionality may be implemented in software rather than hardware. An example processor is the ARM7 processor available from ARM Limited of London, England.

In operation of an example network card, power might be supplied via interface circuits 502 as well as providing a wired datapath for data into and out of the network card. Thus, when the connected computing device desires to send data over the network(s) supported by the network card, the computing device sends the data to an input circuit of interface circuits 502. The input circuit then conveys the data to control/datapath logic 504. Control/datapath logic 504 may format the data into packets if not already so formatted, determine the PHY layer parameters to use for the data, etc., and possibly other processes including some well-known in the art of networking that need not be described here in detail. For example, logic 504 might read a real-time clock from card clock circuit 512 and use that for data handling or include a real-time clock value in header data or other metadata.

Logic 504 then outputs signals representing the data to baseband modem circuitry 506 which generates a modulated baseband signal corresponding to the data. That modulated baseband signal is provided to RF section 508. The timing of output of signals of logic 504 and other parts of the network card might be dictated by a timing clock signal output by card clock circuit 512. RF section 508 can then be expected to output an RF, modulated signal to antenna 510. Such output should be in compliance with requirements of nodes of the networks with which the computing device is associating.

For example, if the computing device is expecting to be associated as a node in an 802.11b network, the signal sent to antenna 510 should be an 802.11b compliant signal. Also, the control/datapath processes should process data in compliance with the requirements of the 802.11b standard. Where the computing device is expecting to be a dual-net device, the signals sent should be compliant with the protocols and/or standards applicable for the network to which the signals are directed, and be done in such a way as to deal with the fact that while communication is happening among devices of one network (such as the primary wireless network or the secondary wireless network), those signals might be heard by devices that are only devices in a different network (such as the secondary wireless network, the primary wireless network or other network) and the signals should be such that devices can at least co-exist.

Where the computing device is a dual-net device, its network card would provide signals for the primary network and the secondary network. In one example mentioned herein, the primary network is an 802.11x network and the computing device is a STA node for that network and the secondary network is a PAN and the computing device is the COORD for that network. In some implementations, network communications are handled using a software platform that supports network applications.

In some embodiments, wherein 802.11x or other PWN protocols do not need to be supported, the built-in wireless circuitry or network card could be designed to handle only SWN protocols, as would be the case where the network comprises all devices that are capable of handling SWN protocol communications. Examples of such protocols include protocols that operate between devices built by H-Stream Wireless, Inc. to communicate using an H-Stream protocol such as their HSP protocol. In some HSP-enabled devices, the network logic can be entirely represented with software that accesses the RF section of a device that might be a generic network interface, possibly using additional hardware. However, where both ends are HSP-enabled devices, they might use their own hardware and control it at whatever level is needed for best performance.

Figure 6:
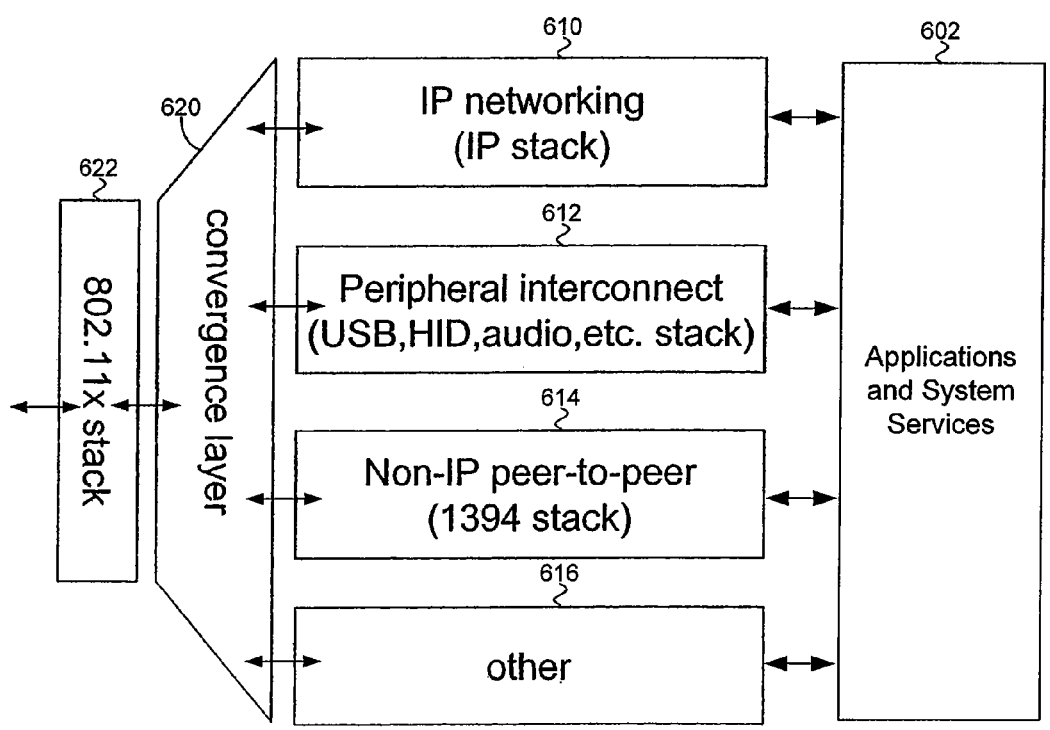
FIG. 6 is a block diagram of software components that might comprise software and/or logical constructs to interface applications with the networks supported by a COORD/dual-net device.

FIG. 6 illustrates a platform 600 as it might be present in a dual-net device, that represents software and/or logical constructs that together can be thought of as logical elements available for processing data within the computing device. As such, they need not be implemented as separate hardware components or distinct software components, so long as their functionality is available as needed. Other variations are possible, but in the layout shown, applications and system services (shown as block 602) are programmed to interface to various stacks, such as an IP networking stack 610 (sometimes referred to as an "IP stack"), a peripheral stack 612 (USB, HID, audio, etc.), a non-IP stack 614 (for IEEE 1394 interfacing) or other stack 616. For example, an application such as an HTTP browser might expect to communicate using TCP/IP and thus that application would have been configured to communicate with the computing device's IP stack.

A convergence platform can be added between an 802.11x stack and the different drivers to enable multi-protocol support, expose and coordinate access to specific MAC service primitives and coordinate the priority handling in Quality-of-Service (QoS) sensitive applications. This convergence platform can be a separate software layer or can also be integrated within the 802.11x stack.

For certain stacks, additional services may be required that might not be supported inside the 802.11x stack. If that is the case, such overlay protocol services may reside either inside the convergence layer or in between the convergence layer and the respective stack. As an example, communication with peripherals may require protocol services in addition to the protocol services provided by the 802.11x stack in order to meet the power and latency requirement typical of such applications. Such protocol services may be part of the convergence layer, or may reside in between the convergence layer and the Peripheral Interconnect Stack. Of course, as an alternative, the 802.11x stack may have been adapted to support such services.

Each of the stacks 610-616 is shown coupled to a convergence layer 620, which provides the necessary and/or optional conversions of data, protocol, timing, etc. so that each of the higher level stacks 610-616 are interfaced to an 802.11x stack 622. 802.11x stack 622 can then interface to the computing device's network card (or other network circuitry). In this manner, for example, stack 622 might handle a browser's traffic that goes through IP stack 610 while also handling a mouse interface whose traffic goes through peripheral stack 612. Note that with a single 802.11x stack, a single network interface can carry traffic for more than one higher-level stack. The single network interface needs to be tuned to deal with the different requirements of the different stacks.

Communication protocols can be implemented with drivers or firmware that is installed on the dual-net device/COORD. The drivers or firmware might comprise an 802.11x peripheral service function (e.g., for implementing the services of the overlay protocol that are not supported inside the 802.11x stack), which can be application-independent, and an adapter driver to connect the 802.11x stack and 802.11x peripheral service function to the appropriate driver inside the dual-net device/COORD platform. The adapter driver may be device class or device specific.

Figure 7:
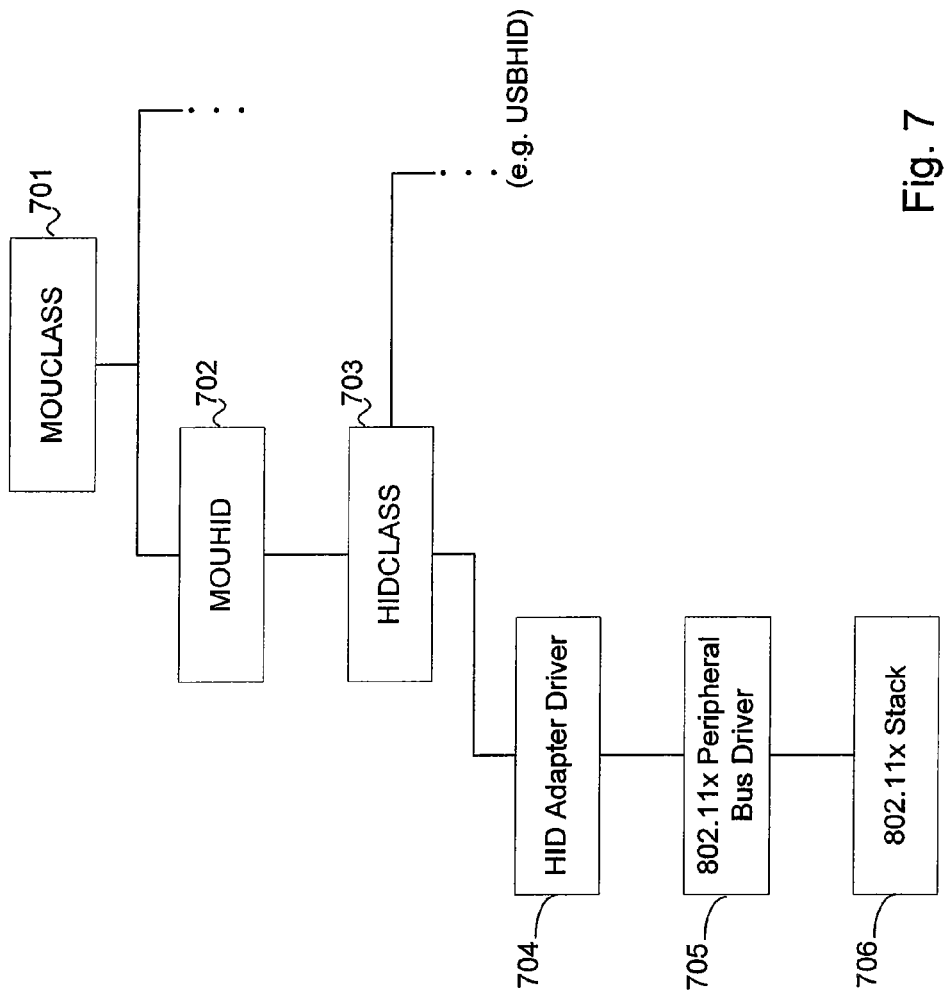
FIG. 7 is a block diagram of classes and objects that might be used in an interface between a network and applications.

An example of this is illustrated in FIG. 7 for a wireless PAN where a mouse is connected over the WM to the standard HID class driver in a PC running on the Windows (or other applicable Operating System (OS)). The driver or firmware resides between the 802.11x stack 706 and the standard HID class driver 703. In a specific implementation, the driver or firmware can constitute an HID adapter driver 704 and an 802.11x peripheral bus driver 705.

Other variations of what is shown in FIG. 7 are possible. For example, the 802.11x peripheral service function might connect up to the MOUHID driver 702 directly. In that case, the HID adapter driver is written as an HIDCLASS miniport driver. This driver then layers under the MOUHID 702 and MOUCLASS 701 drivers and allows mouse data to be injected into the operating system.

Alternatively, the adapter driver may connect to the USB stack instead. The adapter driver may, for example, be written as a virtual USB bus driver and connect up to the standard USB stack available as part of the operating system or operating system modifications. Depending on the specific implementation, the adapter driver may connect at different layers into the USB stack.

In specific embodiments, the 802.11x peripheral service function and adapter driver may be combined in a single driver. Alternatively, two separate drivers may be used and a private interface might be defined and used between both drivers.

The adapter driver receives the 802.11x frames from the 802.11x peripheral service function that are intended for the higher layer driver (e.g., MOUCLASS driver). Similarly, the adapter driver receives frames from the higher layer driver that are to be transmitted to a PER using the 802.11x circuitry. The adapter driver and 802.11x peripheral service function generate and decode the necessary packet header for running a specific application, like the HID protocol, over an 802.11x data channel. For example, it removes the 802.11x-specific MAC header and performs the necessary manipulation to transform it in the correct format to be passed on to the respective class driver.

Figure 8:
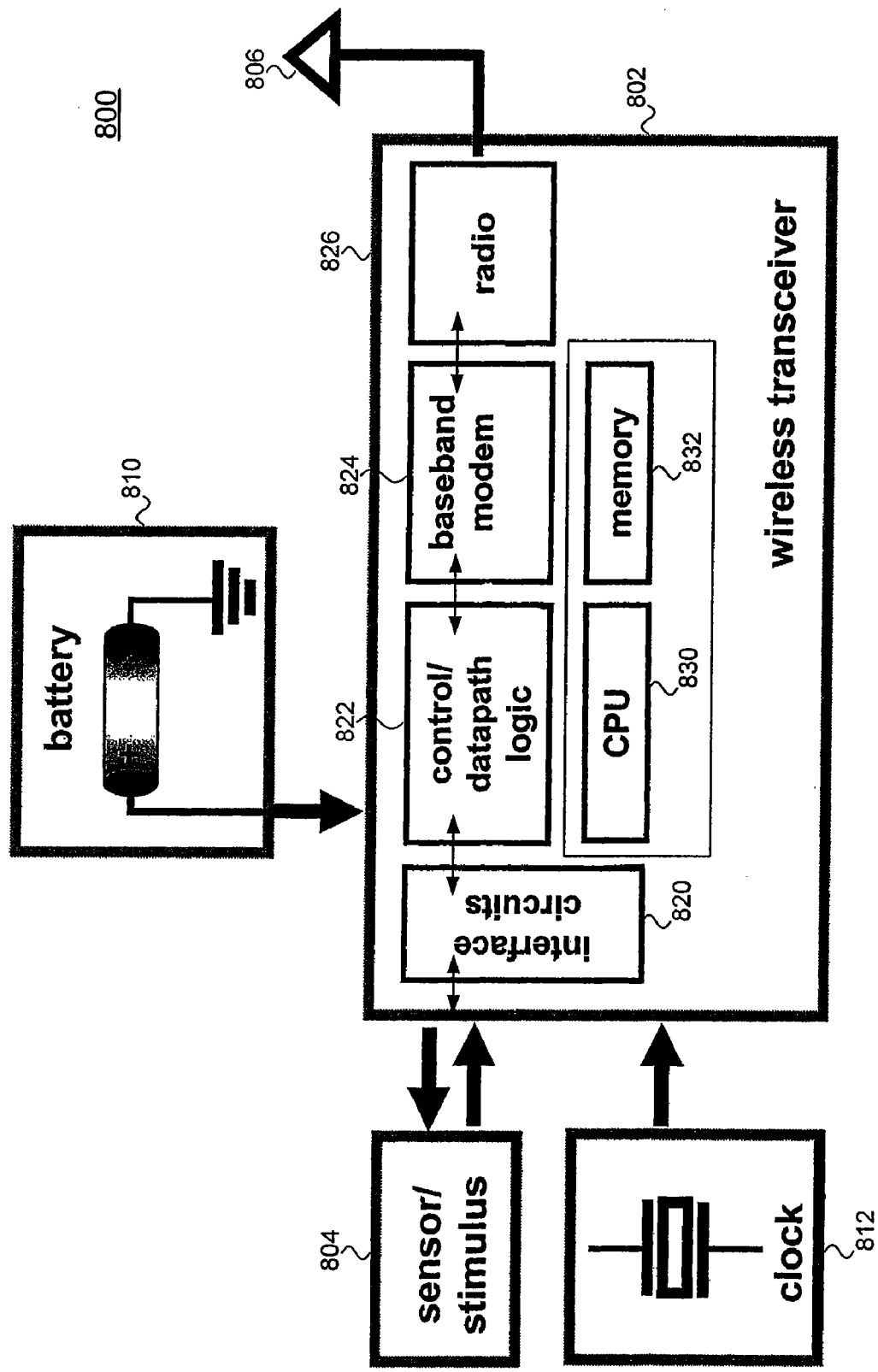
FIG. 8 is a block diagram of an example of a PER device.

FIG. 8 is a block diagram illustrating an example of what might be the components of a PER device. As shown, PER 800 comprises a wireless transceiver 802 coupled to sensor/stimulus elements 804 and antenna 806. Additional components, such as a filter, a balun, capacitors, inductors, etc., may be present between wireless transceiver 802 and other elements. Generally, wireless transceiver 802 allows other networked devices to understand results of sensing (in the case of a PER that does sensing, such as a mouse, microphone, remote condition sensor, etc.) and/or to specify stimulus (in the case of a PER that outputs visual, audio, tactile, etc. outputs, such as a printer, headset, etc.). It should be understood from this disclosure that PER can be a wireless input and/or output device and in many cases, the wireless transceiver can be designed independent of the particular input and/or output.

FIG. 8 also shows a battery 810 and a clock circuit 812. Battery 810 provides power for wireless transceiver 802 and elements 804 as needed. As weight and portability are likely to be important in the design of the PER, battery consumption will often have to be minimized for a good design. Clock circuit 812 might provide real-time clock signals as well as providing circuit timing clock signals.

As shown, wireless transceiver 802 comprises interface circuits 820, control/datapath logic 822, a baseband modem 824, and an RF section 826. Control/datapath logic 822 might be implemented with circuitry that includes a central processing unit (CPU) 830 and memory 832 for holding CPU instructions and variable storage for programs executed by CPU 830 to implement the control/datapath logic. Control/datapath logic 822 might include dedicated logic wherein CPU 24 and memory module 25 implement the portion of the communication protocol that is not implemented in the dedicated control and datapath logic. The CPU instructions might include digital signal processing (DSP) code and other program code. The other program code might implement MAC layer protocols and higher-level network protocols.

Clock circuit 812 might include a crystal oscillator. Clock circuit 812 might be aligned with clocks in other network devices, but the clocks may drift over time relative to each other.

Although not shown, other components like capacitors, resistors, inductors, filters, a balun, a Transmit/Receive (T/R) switch, an external power amplifier (PA) and an external low-noise amplifier (LNA) may also be included in PER 800.

Wireless transceiver 802 might be configured so as to communicate over the physical layer (PHY) of a standard IEEE 802.11-compliant circuit chip. Wireless transceiver 802 may be an embedded System-on-Chip (SoC) or may comprise multiple devices as long as such devices, when combined, implement the functionality described in FIG. 8. Other functionality, in addition to the functionality of FIG. 8 may also be included. Wireless transceiver 802 might have the ability to operate, for example, in the unlicensed 2.4-GHz and/or 5-GHz frequency bands.

FIGS. 9-11 illustrate basic processes of interactions between a master device and a slave device for handling reservations of a medium. As shown therein, a reservation-modification process might have a slave device requesting a modified reservation from a master device and communicating using the new reservation within the same service period without violating the reservation scheme imposed by the master device.

It is assumed that the slave device knows when a time slot for its communication occurs. This might happen by the master device sending a message indicating that the slave device should transmit immediately or at a specific time (e.g., a "poll" from the master device), or might be according to an agreement previously made between the master device and the slave device defining one or more times for the slave device to transmit.

Preferably, the network is configured such that there are not a large number of devices having time slots and no need to access the network during those time periods. For many devices coupled to a wireless PAN, there might always be something to do on the network. For example, a wireless mouse can be expected to have some mouse movements to report to a computer operating system where mouse activity is conveyed to the computer over the wireless PAN, and if not, be needing a query from the computer so that the mouse can report that there has been no activity.

Presumably, however it is arranged, the message or reservation indicates to the slave device the length of time allotted for the transmission, i.e., the length of the medium reservation for the slave device. The length might be done pre-arrangement (e.g., send N bytes every service period), etc., or determined from a message from the master device at the start of a service period. Another example is by inference based on further knowledge of the capacity of the communications system or knowledge of other transmissions that need to be scheduled. Other mechanisms are also possible and might also be used in connection with the present invention.

Prior to transmitting its data, the slave device verifies that the amount of data to communicate to the master device matches the length of the medium reservation for the communication. This verification can occur a priori to the beginning of the service period or could be made based on information received from the master device at the start of, or during, the service period.

If the medium reservation is insufficient or exceeds the slave device's needs, the slave device may transmit a request for a medium reservation modification. The request may or may not be accompanied by some data to be transmitted. The request for a longer or shorter medium reservation may or may not be reduced by an amount corresponding to the data being transmitted with the request.

The request for a modified medium reservation from a slave device may be answered by a master instantaneously or some time later, but in any case within the same service period. A slave device may or may not send data with its request for a medium reservation modification. The next medium reservation may occur (1) instantaneously, without requiring new contention for medium by the master device, (2) pseudo-instantaneously, which differs from case (1) in that the master device must again contend for the medium, or (3) some time later but still within the same service period.

Medium reservation modification requests from a slave device can be cascaded to allow a slave device to request medium extensions multiple times in the same service period. The slave device can cascade multiple medium reservation extension requests by repeating one of the methods disclosed herein multiple times within a single service period. The slave device may cascade medium reservation extension requests for various reasons, including (1) more data has become available since the slave device's previous medium reservation extension, (2) the amount of data that the slave device wishes to transmit exceeds a maximum packet size, maximum fragmentation threshold, or other maximum data transfer size, or (3) a combination of the above reasons or other reasons.

Medium reservations and medium reservation modification requests may be exact or may be approximate. A master device may make an allocation of the exact number of bytes or time period that a slave device will transmit, or an approximation of the reservation required by the slave device. Conversely, a slave device may make a request for a larger or smaller medium reservation based on an exact calculation of the amount of data to be sent versus the length of the medium reservation or based on an approximate calculation of the same. One situation where the calculations may be approximate is when the master device or slave device does not have the ability to make an exact calculation of the bandwidth versus data available at the start of a service period, or if the units of bandwidth reservation do not divide evenly into the units of transmission. One specific example of this is if the units of medium reservation are time (e.g., microseconds) while the units of transmission are data (e.g., bytes or bits).

The master device may deny a slave device's request for a modified reservation through any of a number of mechanisms. Some examples of mechanisms for the master device to deny the request include the lack of a response to the slave device's request, a specific message from the master device indicating that the larger reservation has been denied, a message from the master device with a smaller reservation than requested, or various other mechanisms.

Comparison with Other Approaches

As should be apparent after reading this description, the technique described above improves over the technique of over reserving the medium and having the "reserved-for" device signal an early release of the medium when the device is done using it. It is not ideal to wait to signal a medium contraction until the end of a transmission because (1) it does not give other devices that may want to use the medium any time to prepare a new transmission before the transmission has ended, (2) other devices may have turned off their receivers while waiting until the end of the previous reservation, and therefore will not know about the newly-available medium, and (3) it uses additional network capacity which could otherwise be spend on meaningful data communication. It would be advantageous to instead have a mechanism, such as that described herein, that negotiates the reduced medium reservation sooner, as other devices could be designed to wait to hear that negotiation before turning off their receivers and/or could prepare for using the medium when the medium is free, which is possible since devices learn early that there will be a shortened reservation. Also, rather than over-reserving the medium and then applying medium contraction, the network might be more efficiently used if the reservation is for the estimate of time required, and then extended or contracted using, for example, the extension or contraction mechanisms described herein when the actual required time for data transmission is different from that estimated.

An important limitation in general of existing reservation methods is that a slave device does not have the ability to extend the medium allocation within the same service period. If the reservation is insufficient for a slave device to complete its data transmission, only part of the data is transmitted in the service period, and additional data is pushed out to the next service period.

A slave device may also request a larger reservation, but that larger reservation does not take effect until at least the following service period. The net effect is that at least one service interval's delay may be introduced in the communication of data from a slave device to a master device. In a high-QoS application (e.g., voice communication or other low-latency application), the additional delivery latency may cause quality degradation.

Conversely, if the reservation exceeds the amount that is required for a slave device to transmit its data, the medium would be reserved for too much time and cause lost opportunities for communication between devices sharing the communications medium.

FIG. 9a is a timing diagram of a poll-response sequence for a case where a master device reserves the medium for a slave device for a time period acceptable to the slave device. That figure shows an example of a master poll, slave device response, and (optional) master device acknowledge sequence.

In each of the timing diagrams used herein, an activity is shown by a box positioned vertically to align with the device taking that activity, with the devices labelled along the left edge of the diagram, and the box positioned horizontally relative to other boxes to convey an order in time, with time flowing from left to right. The relative sizes of the boxes are not necessarily indicative of relative times, unless otherwise indicated.

Thus, FIG. 9a shows that a master device first sends out a poll message. That poll message is addressed to a particular slave device and includes an indication of a reservation length, shown as "Reservation 1". Presumably, each device that is mastered by the master device will receive this poll message and all other slave devices will know how long the network is reserved for and will not contend for the network during that time.

Following the poll message, the slave device to which the poll message is directed will determine the reservation length and, in this example, finds the length acceptable and transmits the data it has. That data might be directed anywhere, but commonly it would be directed to the master device. Following the data transmission, the master device optionally responds with an acknowledgment of reception (labeled "ACK"). As shown, all of this activity happens within the reserved period, so all other devices, being well-behaved, deferred and thus do not interfere with that activity.

FIG. 9b is a timing diagram of a poll-response sequence for a case where a master device reserves the medium for a slave device for a time period and the slave device desires a different time period.

FIG. 9b shows that a master device first sends out a poll message, addressed to a particular slave device and includes an indication of a reservation length, shown as "Reservation 1". Following the poll message, the slave device will determine the given reservation length and, in this example, determines that a different length would be better and transmits a medium extension request within the first reservation period. The medium extension request might or might not contain some of the data that the slave device has to transmit.

The master device, upon reception of the medium extension request, processes the requests and prepares a medium extension response. Upon gaining access to the medium, the master responds to the medium extension request with a medium extension response containing a new reservation (labeled "Reservation 2") defining a second reservation period. The new reservation grants, denies, or modifies the slave device's request. Note that at all times in this example, the slave device communicates within the reservation limits made by the master device.

The slave device responds to the master device with as much data as possible (or all data it has) during the second reservation period. The master device optionally responds with an acknowledgment of reception (labeled "ACK"), all preferably within the second reservation period.

In the figure, it is shown that the data sent from the slave device is done entirely within the second reservation period and the sending starts after the end of the first reservation period. This need not be the case. If the first reservation period is long enough, data might begin being sent before the end of the first reservation period.

FIG. 9c shows a medium reservation extension sequence similar to that shown in FIG. 9b, but wherein the medium extension response is granted prior to the expiration of medium reservation 1. The master device, upon reception of the medium extension request, responds (possibly after some processing) with a medium extension response containing a new reservation (labeled "Reservation 2") defining a second reservation period. The new reservation grants, denies, or modifies the slave device's request. Note that the medium extension response begins during the first reservation period, so well-behaved devices will be quiescent during that period and will receive the medium extension response and defer for the second reservation period. As such, no new medium arbitration or similar access procedures are required to get access to the medium.

The slave device responds to the master device with as much data as possible (or all data it has) during the second reservation period. The master device optionally responds with an acknowledgment of reception (labeled "ACK"), all preferably within the second reservation period.

As illustrated in the examine of FIG. 9c, the data sent from the slave device is sent entirely within the second reservation period and the sending starts after the end of the first reservation period. This need not be the case. If the first reservation period is long enough, data might begin being sent before the end of the first reservation period. In some embodiments, however, the first reservation period expires early, after the second reservation period starts but before it was scheduled to end. In any case, the preferred operation is such that the first and second reservation periods overlap and the various messages that form the transaction conclude before or at the end of the second reservation period. All other devices, being well-behaved, defer and thus do not interfere with that transaction.

FIG. 10 shows a corresponding medium reservation extension sequence as that of FIG. 9, but wherein there is no master poll at the start of the service period. This is possible, for example, where the master device and slave device have pre-agreed to a service interval and service period. The slave device transmits at the beginning of the service period. FIG. 10a shows the transmission sequence (with optional master device acknowledgment) if the pre-agreed-to medium reservation is sufficient and FIG. 10b shows the transmission sequence (with optional master device acknowledgment) if the pre-agreed-to medium reservation is insufficient.

Figure 10C:
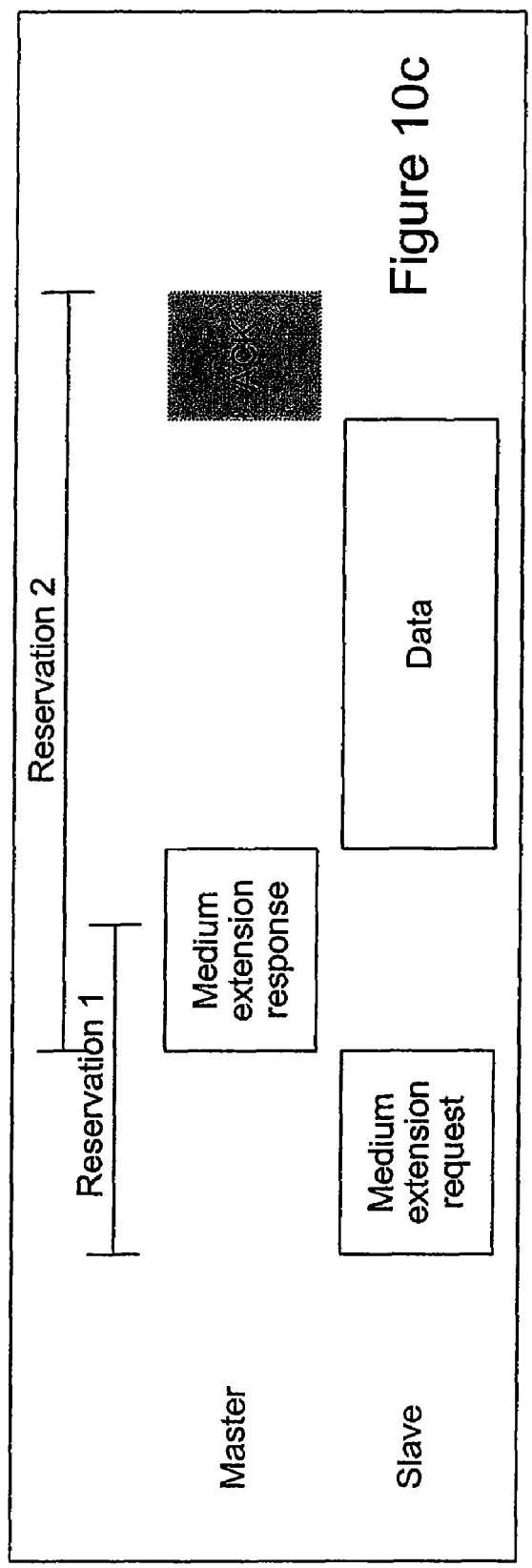
FIG. 10c is a timing diagram of a reservation sequence similar to that of FIG. 9c, but where the request for a different time period is granted within the original medium reservation, therefore not requiring an additional medium arbitration.

FIG. 10c shows the transmission sequence of FIG. 10b, but where there is an overlap of the reservation periods.

Similar processes can be used for a medium reservation contraction sequence. FIG. 11 illustrates an example of this. A reader of ordinary skill can extend the variations of the cases described above in FIGS. 9-10 for the medium reservation extension to medium reservation contraction after reading this disclosure.

As illustrated in FIG. 11, a master device first sends out a poll message, addressed to a particular slave device and includes an indication of a reservation length, shown as "Reservation 1". Following the poll message, the slave device will determine the given reservation length and, in this example, determines that a shorter length would be better and transmits a medium contraction request within the first reservation period. The medium contraction request might or might not contain some of the data that the slave device has to transmit.

The master device responds to this medium contraction request with a medium contraction response containing a new reservation (labeled "Reservation 2") defining a second reservation period. The new reservation grants, denies, or modifies the slave device's request. Note that the medium contraction response begins during the first reservation period, so well-behaved devices will be quiescent during that period and will receive the medium extension response and defer for the second reservation period. Also, because the request and response occur near the start of the first reservation period, devices that disable their receivers to save power during a deferral period will know that the deferral period is shorter than the first reservation period. The boxes are not shown to scale, but typically more of the period is used for data transmission than handshaking.

The slave device responds by sending data and the master device optionally responds with an acknowledgment of reception (labeled "ACK"), all preferably within the second reservation period. As shown, all of this activity happens within the reserved period, so all other devices, being well-behaved, deferred and thus do not interfere with that activity.

Figure 12:
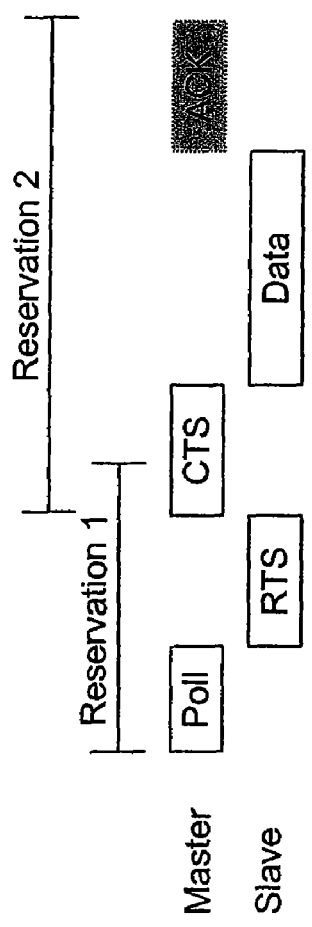
FIG. 12 is a timing diagram illustrating an example of a medium reservation extension request in the specific embodiment of an 802.11-compatible network using RTS and CTS as the medium reservation modification mechanism.

FIG. 12 shows an example of medium reservation extension request in a specific embodiment of nodes of an 802.11-compatible network using a RTS/CTS process as the medium reservation modification mechanism. An advantage of this technique is that where there are devices receiving the signals from the master device and/or the slave device, but are not aware of the medium reservation extension capabilities (as would be the case with conventional 802.11 devices), those other devices will behave (because they follow the conventions of their standards) in a manner that will allow the slave device to enjoy the extended reservation nonetheless.

In the sequence shown in FIG. 12, the master device initiates the communication with a poll, which explicitly or implicitly reserves the medium for the first reservation period (labeled "Reservation 1"). If the reservation was sufficient for the slave device to transmit its data, the slave device would transmit the data at this point. However, in this example, where the slave device realizes that the medium reservation is insufficient, it sends an RTS to the master device in response to the poll as a medium reservation extension request. The master device grants the medium reservation extension with a CTS. The CTS reserves the medium for the second reservation period (labeled "Reservation 2"). The slave device has successfully negotiated a reservation of sufficient length, so it sends its data to the master device. The master device may or may not generate an acknowledge message depending on the details of the communication method in use. As with the earlier case, by negotiation, the expiry of the first reservation period might end as a result of the second reservation period, the expiry might be unchanged, or it might be the case that the actual expiration of the first reservation period doesn't matter, so long as the second reservation period is in place.

Figure 13:
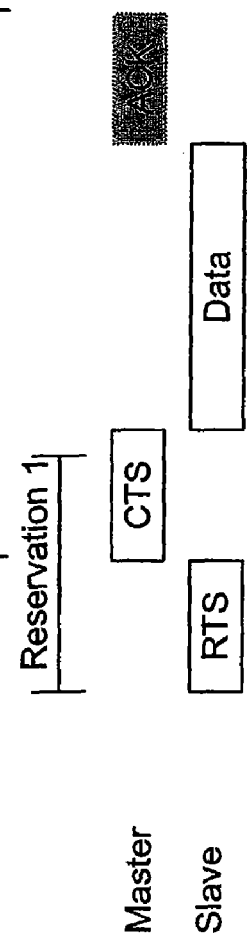
FIG. 13 is a timing diagram illustrating an example similar to that of FIG. 12, without requiring a poll.

FIG. 13 shows a variant of the medium reservation extension sequence of FIG. 12, where there is no master poll at the start of the service period. The master device and slave device have pre-agreed to a service interval and service period. The slave device transmits at the beginning of the service period. The rest of the sequence can be identical to the sequence in FIG. 12.

USB System

In one embodiment, the communication system is a USB system. In this embodiment, a medium reservation for a particular data rate is established by pre-arrangement between the master device (a USB Host) and slave device (a USB peripheral). USB defines an "isochronous" endpoint type for such communications. In USB, the master device indicates the start of a service period to a slave device using an IN token addressed to an isochronous endpoint on the slave device.

The slave device, in response to this token, responds with a message to the master device requesting a longer or shorter medium reservation within this service period. The message from the slave device may come in a variety of forms: (1) it may be a new type of token not previously defined in USB, (2) it may be a part of the isochronous response packet, (3) it may be accomplished through special wire-level signaling to the master device (similar to a USB "SE0" signal), or (4) it may be some combination of these and/or other indications to the master device.

The master device receives the slave device's request for a modified medium reservation and generates a response in accordance with other processes described herein. The response could be (1) another IN token, (2) a new type of USB token, (3) the lack of a response, (4) special wire-level signaling to the slave device, or (5) a combination of these and/or other indications to the slave device.

In a related embodiment, the communication system is a system in which a USB protocol is encapsulated in another protocol for physical transmission over a medium. At the application level in the master device, the slave device might appear to be a normal USB peripheral, while what actually happens is that some combination of hardware and software on the master device and/or slave device encapsulate the higher-level USB traffic into another format for physical transmission. In such an encapsulated USB system, the reservation modification scheme still applies, but with signaling appropriate to the PHY/MAC/driver layers of the particular physical transmission medium.

One example of such a system is a USB-over-WiFi implementation, in which application-level software in the master device believes it is communicating directly with a USB peripheral, although there is actually an encapsulation of USB protocol over a wireless WiFi connection. Many other examples of such systems exist and reservation modifications in such systems might also be used with systems, apparatus and methods according to the present invention.

Wireless Systems

In a different embodiment, the communication system is a wireless system with a reservation mechanism. In this embodiment, the master device and slave device communicate over a wireless medium. In this wireless medium, there may or may not be the potential for collisions with other participants in the wireless medium and other interference sources. There may or may not be a collision-avoidance scheme.

In a more specific embodiment, the communication system is an 802.11x-compatible Wireless LAN or Wireless PAN system (such as 802.11a, 802.11b, 802.11g, etc.). An example of such a network is a Wireless Local Area Network (WLAN) based on the 802.11x specification. Another example is a personal area Network (PAN) that is based on the 802.11x specification, which may or may not be fully compliant with such protocol. Such network may, for example, use an overlay protocol. Such network may, for example, use 802.11 frame formats and modifications and/or extensions thereof. Yet another example is a wireless PAN where the master device of the wireless PAN implements the 802.11x specification, and may or may not be associated with a different wireless LAN at the time of communication with its slave devices in its wireless PAN. One example is a network as described in the co-pending U.S. patent application Ser. No. 11/376,753, filed Mar. 14, 2006 entitled "Method and Apparatus for Operating a Wireless PAN Network Using an Overlay Protocol that Enhances Co-Existence with a Wireless LAN Network", which is commonly assigned with the present application, the disclosure of which is incorporated herein in its entirely for all purposes.

The WLAN may or may not have support for wireless PAN devices. In 802.11x networks, a medium reservation mechanism already exists for collision prevention. The medium reservation is implemented with the "Duration" field (also known as NAV) of the 802.11x-compatible MAC header. The Duration field indicates the number of microseconds that the medium is reserved before another station not involved in the current communication sequence can access the wireless medium. In some embodiments, the Duration field is used to provide a medium reservation so that other devices do not attempt to communicate during the specified Duration. Many packet types in an 802.11x-compatible LAN contain a Duration field, and one or more of these packet types may be used to provide the medium reservation.

The Duration field may or may not be interpreted by a slave device to determine the length of the reservation; other approaches for the slave device to know the length of the reservation are possible. The slave device will request a medium extension or contraction as described elsewhere in this disclosure. The Duration field may or may not be used by the slave device as part of the medium reservation modification calculation; other approaches are possible.

In a very specific embodiment, the slave device makes a request for a medium reservation modification (extension or contraction) with a Ready-To-Send (RTS) packet, and the master device responds with a Clear-To-Send (CTS) packet. The mechanism to respond to an RTS with a CTS is already built into 802.11x-compliant hardware and firmware but has not previously been used for reservation extension. The CTS response from the master device occurs a Short Interframe Spacing (SIFS) interval (defined in the 802.11x specification) after the RTS from the slave device arrives and requires no additional medium arbitration.

The slave device may begin transmitting using the modified medium reservation after another SIFS interval, again with no need for arbitration. By turning around each part of the communication sequence in a SIFS and eliminating the need for arbitration, the time period for the entire communication exchange is minimized, thus maximizing power savings by allowing the host and slave device to turn off their receivers quickly. Further, medium reservations made with RTS and CTS frames are intrinsically understood by devices that implement the 802.11x specification, so the medium reservation will be respected by other 802.11x-compliant devices without requiring hardware, firmware or driver modifications or awareness of processes for medium reservation modifications described herein.

Furthermore, since an RTS/CTS frame exchange is understood by existing 802.11x-compliant hardware, firmware and/or drivers, an RTS/CTS medium reservation modification scheme as disclosed herein can be readily implemented in a network where the master device is an 802.11x-compliant device and access to the hardware, firmware and/or driver of such device may or may not be available. As an example, in a very specific embodiment of this invention, the RTS/CTS packet exchange is used as a method of medium reservation modification within the same service period in a wireless PAN network where the master device implements the 802.11x specification, and at the time of communication with one or more of its slave devices may or may not be associated with a different wireless LAN network that is based on the 802.11x specification. The master device may be the access point ("AP") of such wireless LAN network, or may be a regular non-AP station ("STA").

A related specific embodiment uses a frame exchange other than standard CTS/RTS frames but with the same properties of short turnaround times not requiring arbitration. Application data may or may not be communicated in the same frames with the slave device's medium reservation modification request and the master device's medium reservation modification response.

In some variations, there are mandatory service periods (MSPs) and Optional Service Periods (OSPs), along with their associated intervals, i.e., a Mandatory Service Interval (MSI) is defined as the interval between the start of two successive scheduled MSPs and an Optional Service Interval (OSI) is defined as the interval between the start of two successive scheduled OSPs. A MSP is a service period (SP) during which a slave device, such as a peripheral wakes up and participates in a TXOP whether or not it has actual data to send. An OSP is an SP during which the slave device can choose whether or not to wake up and participate in the TXOP. This decision can, for example, be based on whether or not the slave device has pending data to send. The use of OSPs aids with power consumption limiting in a slave device that primarily carries an uplink traffic stream, without increasing latency. An example of such a slave device in which the use of OSPs is quite useful is a cordless mouse.

Preferably, a different packet loss handling service might be supported for frames exchanged during Mandatory Service Periods versus Optional Service Periods. MSIs and OSIs can be multiples of a fundamental or basic Service Interval Unit (SIU).

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method for requesting and granting of a medium reservation modification wherein a master device allocates a medium using reservations that are observed by other devices sharing the medium and a slave device complies with reservations by holding data for transmission until its reservation in time arrives, the method comprising:
   contending, by the master device, for the medium to obtain a reserved transmitting opportunity, wherein contending is performed between a plurality of devices that each have an ability to take over the medium during a contention period, and wherein the plurality of devices does not include the slave device;
   determining, at the slave device, a reserved length of an upcoming transmitting opportunity reserved for that slave device, wherein the upcoming transmitting opportunity is part of the reserved transmitting opportunity reserved by the master device after contending for the medium and making a medium reservation;
   determining, at the slave device, a desired length for transmitting data from the slave device over the medium;

comparing the reserved length and the desired length to determine if a medium reservation modification is warranted;

if the medium reservation modification is warranted, requesting the medium reservation modification during the reserved transmitting opportunity, using the slave device and the medium;

determining, at the master device, whether to grant or deny the medium reservation modification and conveying the determination to the slave device before the end of the reserved transmitting opportunity and without requiring a new medium arbitration; and if the medium reservation modification is granted, transmitting data from the slave device during a modified reservation period that is in compliance with reservation constraints imposed by the master device on the slave device.

2. The method of claim 1, using an RTS/CTS packet sequence between the slave device and the master device to request and rule on the medium reservation modification.

3. A method for requesting and granting of a medium reservation modification wherein a master device allocates a medium, that is part of a wireless communication system according to an 802.11 specification, wherein allocation is done using reservations that are observed by other devices sharing the medium and a slave device complies with reservations by holding data for transmission until its reservation in time arrives, the method comprising:

contending, by the master device, for the medium to obtain a reserved transmitting opportunity, wherein contending is performed between a plurality of devices that each have an ability to take over the medium during a contention period, and wherein the plurality of devices does not include the slave device;

determining, at the slave device, a reserved length of an upcoming transmitting opportunity reserved for that slave device, wherein the upcoming transmitting opportunity is part of the reserved transmitting opportunity reserved by the master device after contending for the medium and making a medium reservation;

determining, at the slave device, a desired length for transmitting data from the slave device over the medium;

comparing the reserved length and the desired length to determine if a medium reservation modification is warranted;

if the medium reservation modification is warranted, requesting the medium reservation modification during the reserved transmitting opportunity, using the slave device and the medium;

using an RTS/CTS packet sequence between the slave device and the master device to request and rule on the medium reservation modification; and then, sending a packet from the slave device that complies with the modified medium reservation wherein delays between packets in a sequence are a short interframe spacing (SIFS) or other short delay such that no medium arbitration is required between the packets in the sequence.

4. The method of claim 3, wherein delays between packets in the sequence are sufficiently short such that no medium arbitration is required between the packets in the sequence.

5. The method of claim 3, wherein the master device is an 802.11 station comprising hardware compatible with the 802.11 specification.

6. The method of claim 5, wherein delays between packets in the sequence are short interframe spacing (SIFS) periods.

7. The method of claim 6, wherein the master device is an 802.11 station comprising hardware compatible with the 802.11 specification.

8. The method of claim 6, wherein the slave device and master device each uses a different packet sequence to communicate the medium reservation modification requests, wherein packets from the slave device and master device are permitted to contain additional user-level data while a new reservation length is being negotiated, wherein user-level data is data that is conveyed between devices for uses other than to facilitate data transfer between devices.

9. The method of claim 6, wherein the RTS/CTS packet sequence happens without an arbitration occurring between frame transmissions from the slave device and/or the master device.

10. The method of claim 6, further comprising one or both of the master device and the slave device generating responses to each other's communications in an interval that is short enough to not require arbitration.

11. The method of claim 10, wherein the interval is shorter than a time required for a third device, that is neither the slave device nor the master device, to initiate medium arbitration.

12. The method of claim 3, wherein the RTS/CTS packet sequence happens without an arbitration occurring between frame transmissions from the slave device and/or the master device.

13. The method of claim 3, further comprising one or both of the master device and the slave device generating responses to each other's communications in an interval that is short enough to not require arbitration.

14. The method of claim 13, wherein the interval is shorter than a time required for a third device, that is neither the slave device nor the master device, to initiate medium arbitration.

15. A method for requesting and granting of a medium reservation modification wherein a master device allocates a medium, that is part of a wireless communication system according to an 802.11 specification, wherein allocation is done using reservations that are observed by other devices sharing the medium and a slave device complies with reservations by holding data for transmission until its reservation in time arrives, the method comprising:

contending, by the master device, for the medium to obtain a reserved transmitting opportunity, wherein contending is performed between a plurality of devices that each have an ability to take over the medium during a contention period, and wherein the plurality of devices does not include the slave device;

determining, at the slave device, a reserved length of an upcoming transmitting opportunity reserved for that slave device, wherein the upcoming transmitting opportunity is part of the reserved transmitting opportunity reserved by the master device after contending for the medium and making a medium reservation;

determining, at the slave device, a desired length for transmitting data from the slave device over the medium;

comparing the reserved length and the desired length to determine if a medium reservation modification is warranted;

if the medium reservation modification is warranted, requesting the medium reservation modification during the reserved transmitting opportunity, using the slave device and the medium; and determining, at the master device, whether to grant or deny the medium reservation modification and conveying the determination to the slave device before the end of the reserved transmitting opportunity and without requiring a new medium arbitration; and wherein the slave device and master device use a packet sequence to communicate the medium reservation modification requests, and wherein the packets from the slave device and master device are permitted to contain additional user-level data while a new reservation length is being negotiated, wherein user-level data is data that is conveyed between devices for uses other than to facilitate data transfer between devices.

16. The method of claim 15, wherein the packet sequence is an RTS/CTS packet sequence between the slave device and the master device.

* * * * *